(12) United States Patent
Aarflot et al.

(10) Patent No.: US 8,908,650 B2
(45) Date of Patent: Dec. 9, 2014

(54) INTERFACE, APPARATUS, AND METHOD FOR COMMUNICATION BETWEEN A RADIO EQUIPMENT CONTROL NODE AND ONE OR MORE REMOTE RADIO EQUIPMENT NODES

(75) Inventors: Torbjöm Aarflot, Sollentuna (SE); Jacob Osterling, Järfaälla (SE); Thomas Ostman, Spånga (SE); Armin Splett, München (DE); Hans Kröner, München (DE); Peter Merz, München (DE); Werner Korte, Walsrode (DE); Rolf Kramer, legal representative, Walsrode (DE); Bernd Hassler, München (DE); Patrick Lagrange, Châteaufort (FR); Eric Georgeaux, Châteaufort (FR); Toshifumi Sato, Tokyo (JP); Hizuru Nawata, Tokyo (JP); Kenichiro Yagawa, Tokyo (JP); Yang Ganghua, Shanghai (CN); Lan Haiqing, Shanghai (CN); Lin Zhibin, Shanghai (CN)

(73) Assignees: Telefonaktiebolaget LM Ericsson (publ), Stockholm (SE); NEC Corporation, Tokyo (JP); Huawei Technologies Co., Ltd., Shenzhen (CN); SIEMENS AG, Munich (DE); Nortel Networks S.A., Chateaufort (FR)

( * ) Notice: Subject to any disclaimer, the term of this patent is extended or adjusted under 35 U.S.C. 154(b) by 2363 days.

(21) Appl. No.: 11/663,045

(22) PCT Filed: Oct. 12, 2005

(86) PCT No.: PCT/IB2005/003036
§ 371 (c)(1),
(2), (4) Date: May 5, 2010

(87) PCT Pub. No.: WO2006/040653
PCT Pub. Date: Apr. 20, 2006

(65) Prior Publication Data
US 2011/0032910 A1 Feb. 10, 2011

Related U.S. Application Data

(60) Provisional application No. 60/617,084, filed on Oct. 12, 2004.

(51) Int. Cl.
| | | |
|---|---|---|
| H04B 7/216 | (2006.01) | |
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04W 88/08 | (2009.01) | |
| H04J 3/06 | (2006.01) | |

(52) U.S. Cl.
CPC ............ *H04W 88/085* (2013.01); *H04J 3/0691* (2013.01); *H04J 3/0682* (2013.01)
USPC ......................................... 370/335; 370/248

(58) Field of Classification Search
USPC ................................................ 370/248, 335
See application file for complete search history.

(56) References Cited

U.S. PATENT DOCUMENTS

| | | |
|---|---|---|
| 5,682,256 A | 10/1997 | Motley et al. |
| 5,870,392 A | 2/1999 | An |
| 6,005,854 A | 12/1999 | Xu et al. |
| 6,058,317 A | 5/2000 | Posti et al. |
| 6,078,576 A | 6/2000 | Schilling et al. |
| 6,400,699 B1 * | 6/2002 | Airy et al. ..................... 370/329 |
| 6,434,137 B1 | 8/2002 | Anderson et al. |
| 6,470,057 B1 * | 10/2002 | Hui et al. ....................... 375/294 |
| 6,643,524 B1 * | 11/2003 | Ishii et al. ..................... 455/560 |
| 6,785,558 B1 | 8/2004 | Stratford et al. |
| 6,930,990 B2 | 8/2005 | Dajer et al. |
| 7,382,805 B1 * | 6/2008 | Raza et al. ..................... 370/528 |
| 7,433,683 B2 | 10/2008 | Dharia et al. |
| 7,489,643 B2 * | 2/2009 | Aggarwal et al. ............. 370/248 |
| 2002/0097697 A1 * | 7/2002 | Bae et al. ...................... 370/335 |
| 2002/0141512 A1 | 10/2002 | Blanke |

| | | | |
|---|---|---|---|
| 2004/0110534 | A1* | 6/2004 | Chung et al. ............... 455/561 |
| 2004/0193724 | A1* | 9/2004 | Dziong et al. ............... 709/232 |
| 2005/0113024 | A1* | 5/2005 | Capece et al. ............... 455/41.2 |

FOREIGN PATENT DOCUMENTS

| | | |
|---|---|---|
| EP | 0 652 644 A2 | 10/1994 |
| EP | 0 993 207 A | 4/2000 |
| WO | 95/05722 A | 2/1995 |
| WO | 2005/034544 | 4/2005 |

OTHER PUBLICATIONS

International Search Report mailed Nov. 28, 1994.
International Preliminary Report dated Dec. 11, 2006.
Translation of Chinese official action, Dec. 21, 2010, in corresponding Chinese Application No. 200580034626.3.
Chinese Office Action issued in corresponding Chinese Application No. 200480028557.0 mailed May 9, 2008.
International Search Report for International Application No. PCT/IB2004/003170 dated Feb. 11, 2005.
Obsai, "The Development and Benefits of and Open Base Station Architecture", Obsai White Paper, Mar. 13, 2003, pp. 1-15, XP002291842.
European Communication dated Jan. 29, 2013 in European Application No. 05 795 927.2-2412.
"Common Public Radio Interface (CPRI); Interface Specification", CPRI specification V1.0, Sep. 30, 2003, pp. 1-54, XP002291001.
"Common Public Radio Interface (CPRI); Interface Specification", CPRI Specification V2.0, Oct. 1, 2004, pp. 1-75, XP-002359217.

* cited by examiner

*Primary Examiner* — Noel Beharry
*Assistant Examiner* — Farhad Ali
(74) *Attorney, Agent, or Firm* — Nixon & Vanderhye, P.C.

(57) ABSTRACT

An interface, apparatus, and method are described for communication between a radio control (REC) node and first and second radio equipment (RE) nodes in a radio base station that transceives information over radio interface using multiple antenna carriers. The REC node is separate from and coupled to the first RE node by a first transmission link, and the second RE node coupled to the first RE by a second transmission link. Both control information and user information intended for communication between the REC node and the first RE node and the REC and the second RE node are conveyed over the first transmission link. The first RE node also conveys information between the REC and second RE node. Many advantageous features are described.

41 Claims, 19 Drawing Sheets

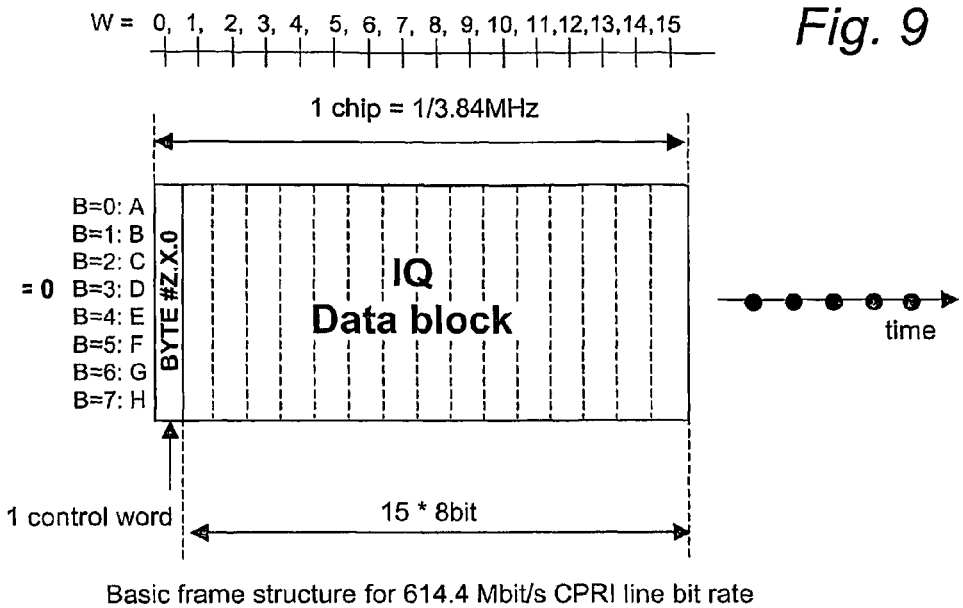
Basic frame structure for 614.4 Mbit/s CPRI line bit rate
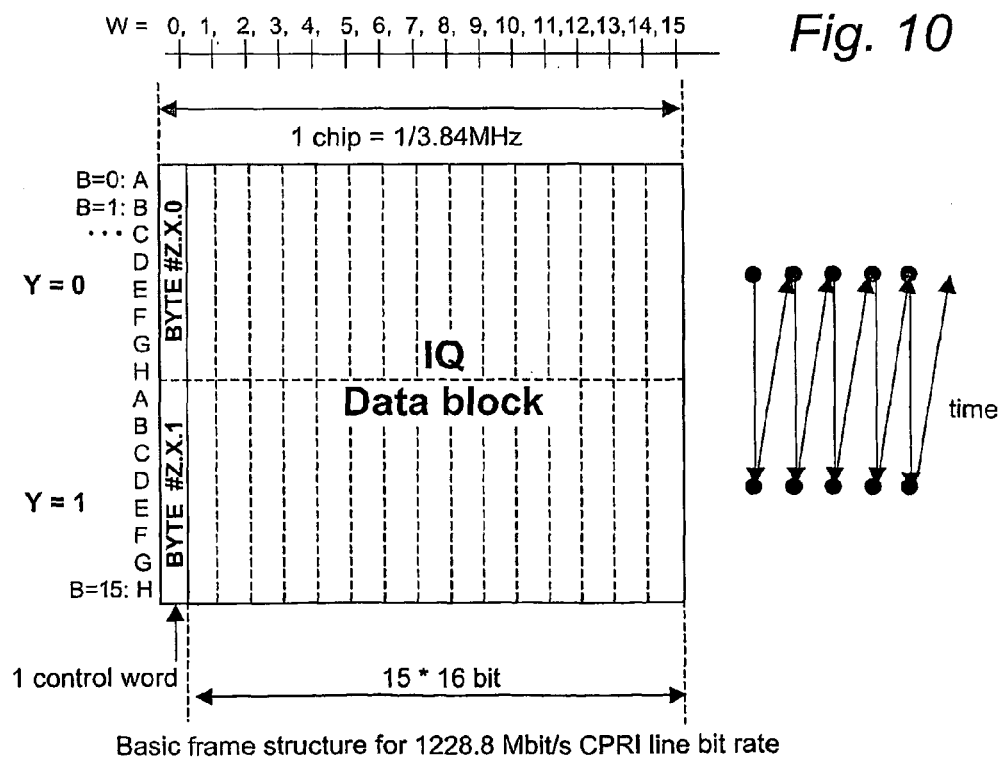
Basic frame structure for 1228.8 Mbit/s CPRI line bit rate Basic frame structure for 2457.6 Mbit/s CPRI line bit rate Illustration of subchannels within one hyperframe Illustration of control words and subchannels within one hyperframe

INTERFACE, APPARATUS, AND METHOD FOR COMMUNICATION BETWEEN A RADIO EQUIPMENT CONTROL NODE AND ONE OR MORE REMOTE RADIO EQUIPMENT NODES

RELATED APPLICATIONS

This application is the U.S. national phase of International Application No. PCT/IB2005/003036, filed 12 Oct. 2005, designating the U.S. This application claims priority from U.S. provisional patent application No. 60/617,084, filed on Oct. 12, 2004, entitled "Common Public Radio Interface (CPRI): Interface Specification (version 2.)." The application also claims priority from and is a continuation-in-part of PCT application serial number PCT/IB2004/003170, filed on Sep. 29, 2004, entitled "Interface, Apparatus & Method for Communication between a Radio Equipment Control Node and A Remote Radio Equipment Node in a Radio Base Station," the contents of each of which is incorporated herein by reference.

TECHNICAL FIELD

The present invention is directed to distributed radio base stations where a base station includes a main baseband processing unit coupled to one or more remote radio units where RF processing occurs, and in particular, to the radio interface between the main baseband processing unit and the one or more remote radio units.

BACKGROUND AND SUMMARY

In a typical cellular radio system, wireless user equipment units (UEs) communicate via a radio access network (RAN) with one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a radio base station. A cell is a geographical area where radio coverage is provided by the radio equipment at a base station site. Each cell is identified by a unique identity, which is broadcast in the cell. The radio base stations communicate over the air interface with the user equipment units (UE) within range of the base stations. In the radio access network, several base stations are typically connected (e.g., by landline or microwave link) to a control node known as a base station controller (BSC) or a radio network controller (RNC). The control node supervises and coordinates various activities of connected plural radio base stations. The control node is typically connected to one or more core networks.

A conventional radio base station in a cellular communications system is generally located in a single location, and the distance between the baseband circuitry and the radio circuitry is relatively short, e.g., on the order of one meter. A distributed radio base station includes the radio equipment control (REC) and the radio equipment (RE). Both parts may be physically separated, (i.e., the RE may be close to the antenna, whereas the REC is located in a conveniently accessible site), or both may be co-located as in a conventional radio base station design. The radio equipment control (REC) performs baseband signal processing, and each radio equipment (RE) converts between baseband and radio frequencies and transmits and receives signals over one or more antennas. Each RE serves a certain geographic area, sector, or cell. Separate, dedicated optical and/or electrical links connect the radio equipment control (REC) to each of the plural remote radio equipment (RE). However, the term link as used hereafter refers to a logical link and is not limited to any particular physical medium. Each link carries digital information downlink from the REC to the RE and digital information uplink from the RE to the REC.

It would be desirable to have a standardized common interface between a REC and one or more REs. Such a standardized interface enables flexible and efficient product differentiation for radio base stations and independent technology evolution for the RE and REC. Such a standard would preferably define necessary items for transport, connectivity, and control including user plane data, control and management (C&M) plane transport mechanisms, and synchronization. Standardization would be particularly beneficial for hardware-dependent layers, e.g., physical layers, to ensure technology evolution on both sides of the interface with only a limited need for hardware adaptation. One advantageous result is that product differentiation in terms of functionality, management, and characteristics is not limited.

Other features that would be desirable to be supported by such an interface include:
  Very high bandwidth utilization with the bandwidth supporting as many antenna-carriers as possible.
  Very low delay (cable delay not included).
  High-performance with respect to time and frequency distribution.
  Flexible control and management signaling bandwidth.
  Plug-and-play startup.
  Flexible line bit rate
  Flexible physical interface These features and others are achieved by an interface, apparatus, and method for communication between a radio equipment control (REC) node and a radio equipment (RE) node in a radio base station that transceives information over the radio interface using multiple antenna-carriers. The REC node is separate from and coupled to the RE node by a transmission link. Both control information and user information are generated for transmission over the transmission link from one of the REC node and the RE node to the other. The user information includes multiple data flows. Each data flow corresponds to data associated with one antenna per one radio carrier. The control and user information are formatted into multiple time division multiplexed (TDM) frames. Each basic TDM frame includes a control time slot for the control information and multiple data time slots for the user information. Each data time slot corresponds to a data flow of one of the antenna carriers. The frames are then transmitted over the transmission link to the other node. In an example implementation in a wideband code division multiple access (CDMA) environment, the time period of the frame corresponds to one CDMA chip time period.

Each antenna carrier has a corresponding time slot in the frame so that the data samples for each antenna carrier are inserted in the antenna carrier's corresponding time slot. The corresponding time slot position in the frame may be fixed or it may be variable. The control information includes multiple different control flows, and a portion of them is included in the control time slot. The different control flows may include, for example, four control flows: radio interface and timing synchronization information, control and management (C&M) information, layer 1 (L1) control information, and extension information. The control and management information includes both fast and slow control and management information, and the L1 signaling indicates the bit rate of both.

The control time slots may be arranged into 64 subchannels. Each such subchannel corresponds to every $64^{th}$ control time slot. The 64 subchannels may then be allocated to carry the four control flows. Multiple basic frames may be combined into a hyperframe, and multiple hyperframes may be combined into a radio frame. One or more borders of the hyperframe are used to map each control time slot to a respective assigned subchannel. Each of the four control words within a hyperframe carries one subflow of a control flow.

The control information includes a known symbol for use in obtaining synchronization between the REC and the RE. The synchronization includes detecting the known symbol to retrieve one or more hyperframe borders. The known signal is periodically provided, and synchronization is obtained without requiring a feedback signal be sent in response to detecting the known signal. In one, non-limiting example implementation, the known signal is a K28.5 symbol.

Start-up communication between the REC and the RE include negotiations of one or more characteristics for the transmission link. The negotiations begin with the REC sending transmissions over the interface, with each transmission using one of several different line bit rates. The RE attempts to detect the line bit rate of each such transmission. If the RE detects one of the REC transmissions, then the RE replies to the REC using the same line bit rate. Similarly, one or both of the REC and RE transmit a highest, supported bit rate for one or more control and management flows. The node with the highest control and management bit rate adopts the highest rate supported by the other node. Alternatively, the REC proposes a lower C&M bit rate. A similar back-and-forth negotiation occurs with respect to the highest supported version of the REC-RE interface communications protocol.

Another feature includes calibrating or compensating for a transmission time delay associated with the transmission link/internal interface. More specifically, the RE obtains an RE time difference between when a frame structure is received from the REC and when the frame structure is transmitted to the REC. Similarly, the REC determines an REC time difference between when a frame structure is received from the RE and when the frame structure is transmitted to the RE. A round-trip delay is determined by subtracting the RE time difference and the REC time difference.

These features can be implemented for a single "hop" connection between an REC and an RE. But they also can be implemented for a "multi-hop" connection composed of an REC coupled to multiple RECs. To facilitate both single hop and multi-hop configurations, the terms master port and slave port are defined and used so that the interface is defined between a master port and a slave port rather than between an REC and an RE. As a result, each link connects two node ports which have asymmetrical functions and roles: a master and a slave. The ports of the REC are master ports. An RE has at least one slave port and optionally one or more master ports depending on whether it is coupled to another RE.

Multi-hop configurations present additional challenges as compared to single hop configurations, particularly in the area of synchronization. The handling of certain system-wide information is also important. Should certain information be passed onto the next RE node and should information not be passed onto the next RE node? Multiple advantages features are described to facilitate multi-hop base station configurations.

A multi-hop configured radio base station exchanges data between a radio equipment control (REC) node and first and second radio equipment (RE) nodes for transceiving information over a radio interface using multiple antenna carriers. The REC node is separate from and coupled to the first RE node by a first transmission link. The first RE node is separate from and coupled to the second RE node by a second transmission link. Control information and user information are provided for transmission over the first transmission link from the REC node to the first RE node, and that information intended for the second RE is forwarded over the second transmission link from the first RE node to the second RE node.

The control information includes layer 1 (L1) signaling, and the L1 signaling includes a service access point defect indicator (SDI) that indicates whether higher layers are operational for data, synchronization, or control and management (C&M). In multi-hop configuration, when the first RE #1 receives the SDI over the first transmission link, the RE #1 ignores the data received over the first transmission link, and forwards the SDI over the second transmission link to the second RE #2. Alternatively, when the first RE #1 receives the SDI over the first transmission link, the first RE node can transmit data received on a redundant first transmission link over the second transmission link to RE #2. Also, if the control information sent by the REC includes a reset indicator, the first RE #1 initiates a reset operation for the first RE #1 and also sends the reset indicator to the second RE #2.

Time delay calibration for multi-hop configuration is more complicated than for single hop. In general, a first transmission time delay associated with the first transmission link and a second transmission time delay associated with the second transmission link are determined. The first and second transmission delays are used to determine in a loop delay associated with the REC node, the first RE #1, and the second RE #2.

An example more detailed time delay compensation scheme for multi-hop includes each RE providing the REC with a time offset between the RE's input slave port and output slave port. The REC transmits a first frame synchronization signal to the first RE at a first time. The first RE provides the REC with a downlink delay associated with receiving a first frame synchronization signal on its input slave port and transmits the first frame synchronization signal on its output master port. The first RE provides the REC with an uplink delay associated with receiving a second frame synchronization signal on its input master port and transmits a third frame synchronization signal on its output slave port. The REC receives the third frame synchronization signal at a second time and determines a time difference between the first and second times. Ultimately, the REC determines a first transmission time delay associated with the first transmission link and a second transmission time delay associated with the second transmission link based on the time difference, the downlink delay, the uplink delay, and each time offset.

These and other features and advantages are further described in connection with the figures and the detailed description.

BRIEF DESCRIPTION OF THE DRAWINGS

FIG. 9 shows a basic frame structure for a particular, example CDMA chip period and CPRI line bit rate;

FIG. 10 shows a basic frame structure for a particular, example CDMA chip period and higher CPRI line bit rate;

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using non-limiting examples, the present invention may be employed to in any type of radio communications system where base stations are used. In some instances, detailed descriptions of well-known methods, interfaces, circuits, and signaling are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
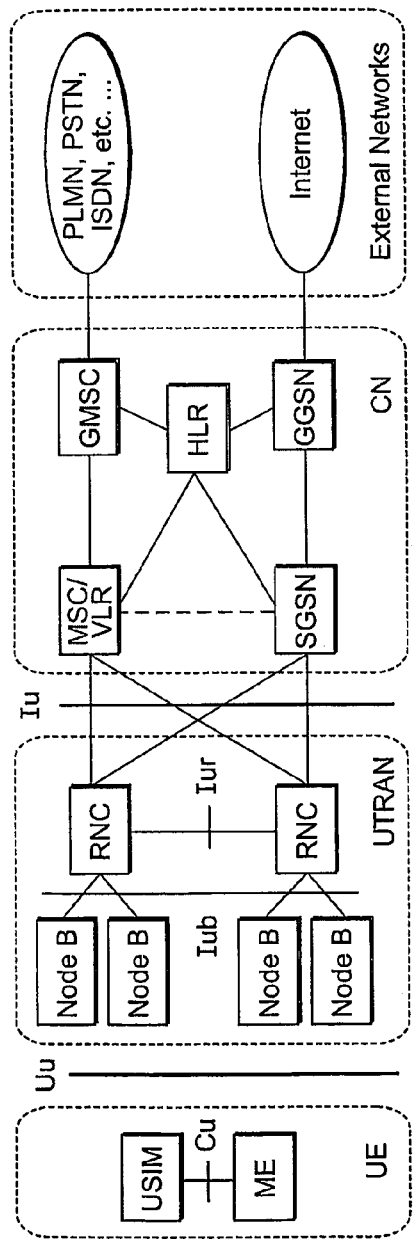
FIG. 1 illustrates a UMTS system that includes several node B or radio base stations.

Because of certain data handling limitations of second generation cellular telecommunication systems, such as GSM, third generation systems were developed to provide high bit rate services that enable, for example, high quality images and video to be transmitted and received and to provide access to the worldwide web with high data rates. These third generation mobile communication systems are referred to as universal mobile telecommunication systems (UMTS). Wideband code division multiple access (WCDMA) is the main third generation access technique used for communications over the radio/air interface. UMTS systems include logical network elements that each have a defined functionality. FIG. 1 shows an example UMTS system. Network elements are grouped into the radio access network (RAN), sometimes as referred to as the UMTS Terrestrial RAN (UTRAN), that handles all radio-related functionality, and the core network (CN) which is responsible for switching and routing calls and data connections to external networks such as PSTN, ISDN, PLMN, and the Internet. The UTRAN covers a graphical area which is divided into cell areas, each cell area being served by a radio base station. A cell is a geographical area where radio coverage is provided by the radio equipment. The user equipment (UE) interfaces the user and the radio/air interface.

Figure 3:
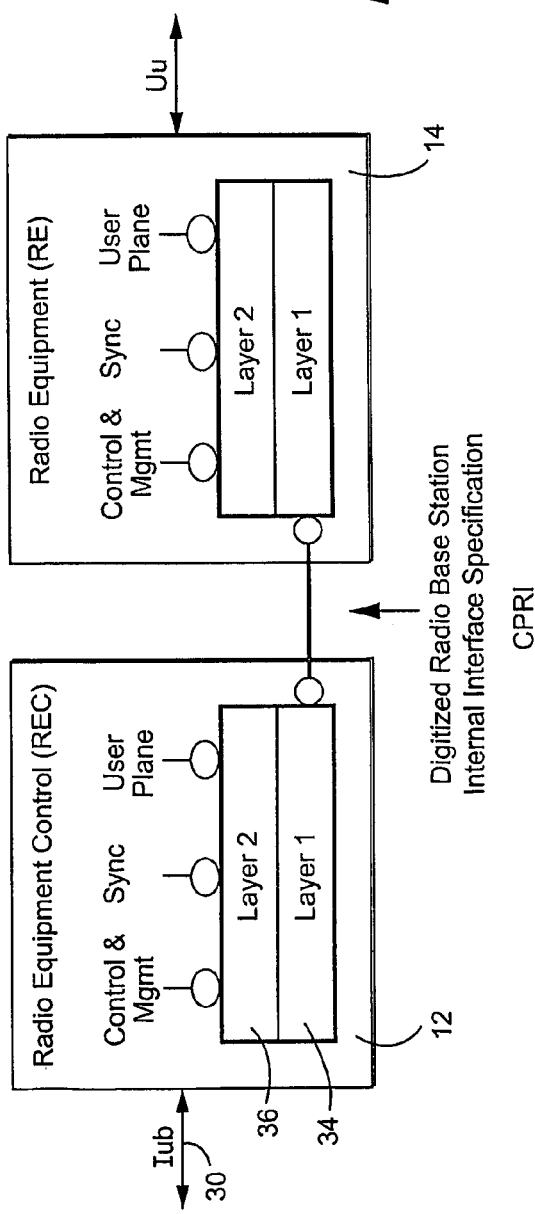
FIG. 3 illustrates a CPRI between the REC/RE and various information flows or planes.

The following description focuses on the node B which converts the data flow between the Iub interface and the radio/air interface Uu. The internal interface within the radio base station which links the REC to one or more REs is referred to as herein as the common public radio interface (CPRI) as shown in FIG. 3. Even though a public interface is envisioned, the CPRI interface could be used as a private interface. The following description is based on UMTS nomenclature, but is not limited just to UMTS systems, but instead, may be employed in any distributed radio base station.

Figure 2A:
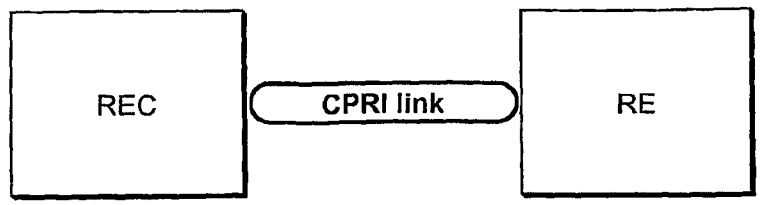
FIGS. 2A-2F illustrate some non-limiting, example REC/RE topologies.
Figure 2B:
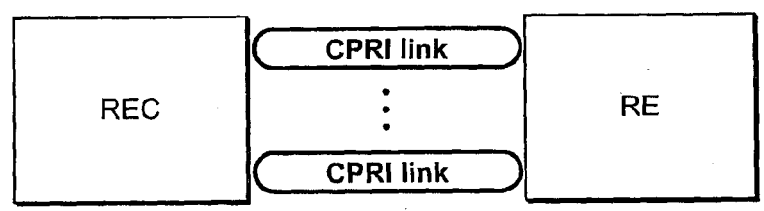
Figure 2C:
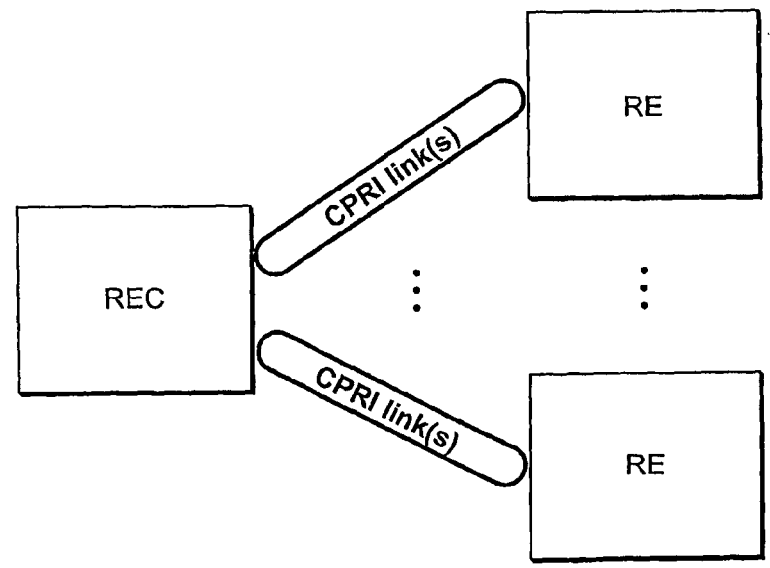
Figure 2D:
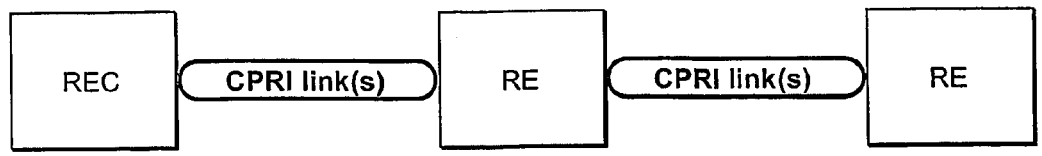
Figure 2E:
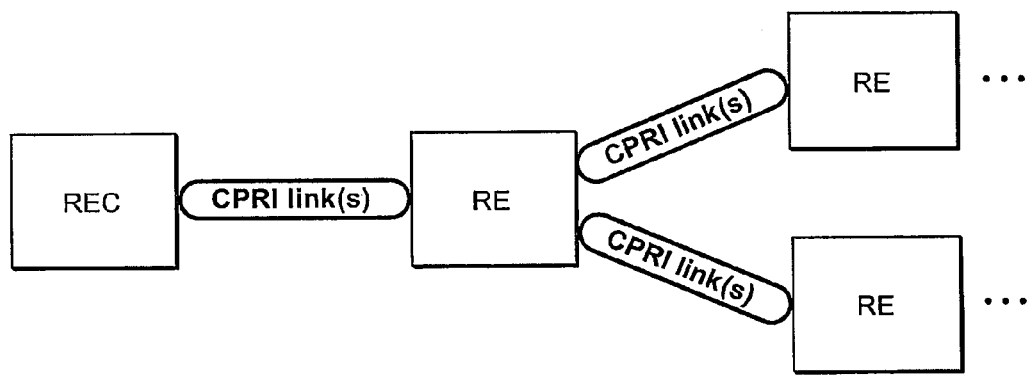
Figure 2F:
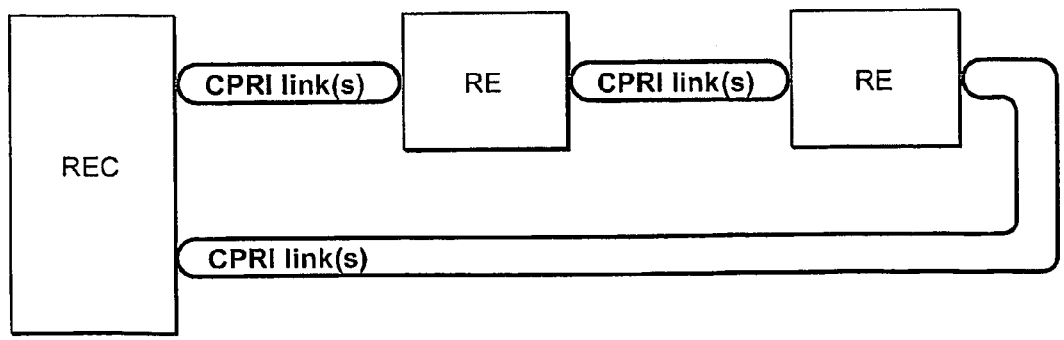

FIG. 2A shows a point-to-point CPRI link between one REC and one RE. FIG. 2B illustrates multiple, point-to-point CPRI links between one REC and RE, and FIG. 2C illustrates multiple, point-to-point CPRI links between one REC and several REs (sometimes referred to as a "star" topology). FIG. 2D shows a chain or cascade network topology with an intervening "networking" RE coupling the REC and the end RE. FIG. 2E shows a tree network topology, and FIG. 2F shows a ring network topology. Other topologies could be used, e.g., a combination of a ring and a tree topology.

The radio equipment control (REC) node provides access to the Radio Network Controller via the Iub interface in a UMTS radio access network, whereas each radio equipment (RE) node serves as the air interface to the user equipment (in the UMTS network the air interface is called the Uu interface). The REC performs the radio functions of the digital baseband domain, whereas each RE performs the analog radio frequency (RF) functions. The functional split allows a generic CPRI interface based on In-phase and Quadrature (IQ) complex data can be defined. Continuing with the non-limiting UMTS example, the REC is concerned with the Iub transports, the radio base station control and management, and the digital baseband processing. Each RE provides the analog and radio frequency functions such as filtering, modulation, frequency conversion, and amplification. An overview of the functional separation between the REC and each RE for the UMTS FDD standard is shown in Table 1.

TABLE 1

| Functions of REC | | Functions of RE | |
|---|---|---|---|
| Downlink | Uplink | Downlink | Uplink |
| Radio base station control & management | | RRC Channel Filtering | |
| | | D/A conversion | A/D conversion |
| Iub transport | | Up | Down |
| Iub Frame protocols | | Conversion | Conversion |

TABLE 1-continued

| Functions of REC | | Functions of RE | |
|---|---|---|---|
| Downlink | Uplink | Downlink | Uplink |
| Channel Coding | Channel De-coding | ON/OFF control to each carrier | Automatic Gain Control |
| Interleaving | De-Interleaving | Carrier Multiplexing | Carrier De-multiplexing |
| Spreading | De-spreading | Power amplification and limiting | Low Noise Amplification |
| Scrambling | De-scrambling | Antenna supervision | |
| Adding of physical channels | Signal distribution to signal processing units | RF filtering Measurements | RF filtering |
| Transmit Power Control of each physical channel | Transmit Power Control & Feedback Information detection | | |
| Frame and slot signal generation (including clock stabilization) | | | |
| Measurements | | | |

Figure 4:
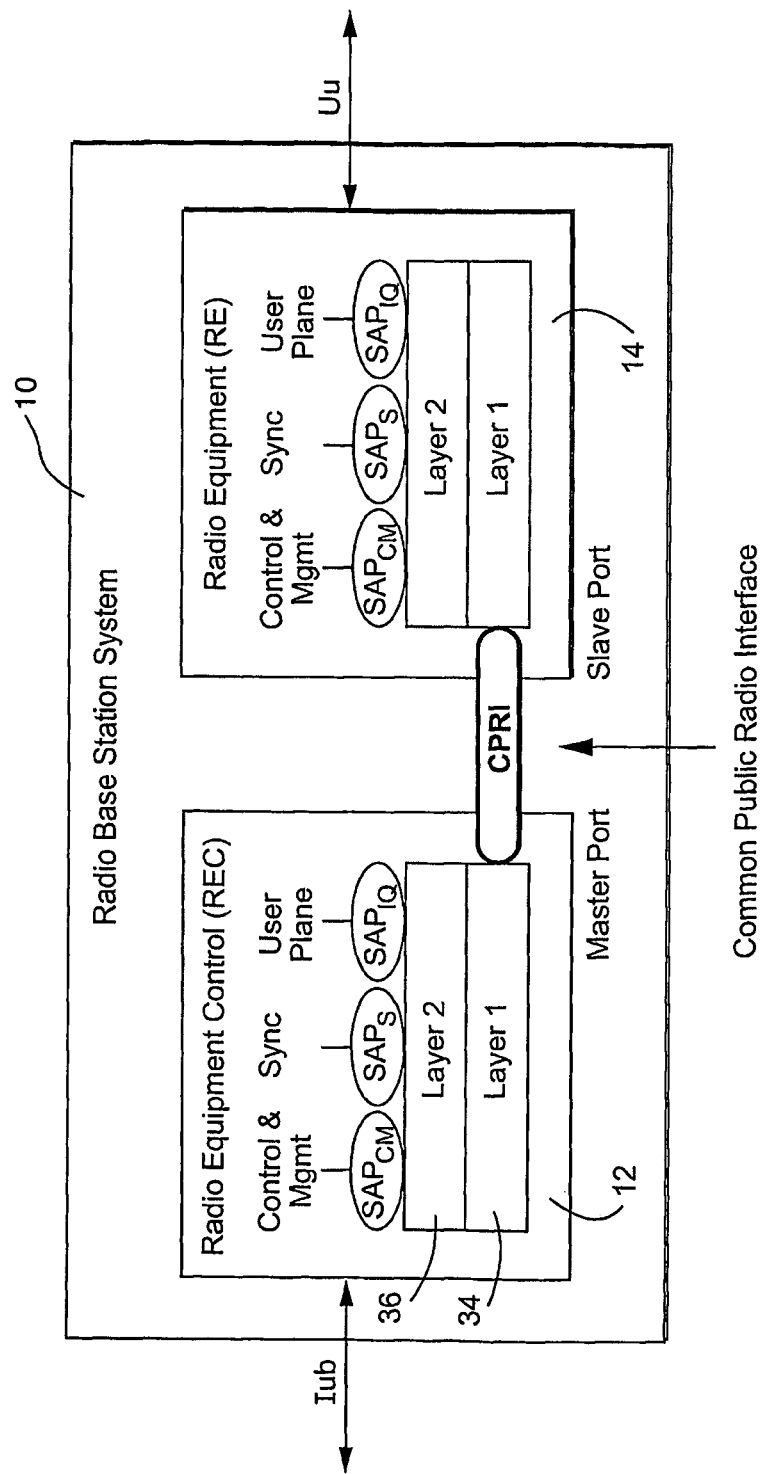
FIG. 4 is similar to FIG. 3 and includes services access points.

In addition to the user plane data (IQ data), control and management (C&M) control signals as well as synchronization control signals are exchanged between the REC and each RE. All information, streams or "planes", including both control and user data, are multiplexed onto a digital serial communication line using layer 1 and layer 2 protocols. See FIG. 3. The different information flows have access to the layer 2 via appropriate service access points (SAPs), as shown in FIG. 4.

The protocols for the physical layer (layer 1), and the data link layer (layer 2) are defined by the CPRI. Layer 1 defines electrical characteristics, optical characteristics, time division multiplexing of different data flows, and low level signaling. Layer 2 defines media access control, flow control, and data protection of the control and management information flow. There are multiple protocol planes or flows. A control plane includes control information used for call processing. A synchronization plane transfers synchronization and timing information between the REC and each RE. A management plane includes management information for the operation, administration, and maintenance of the CPRI interface and each RE. The user plane includes user data that must be transferred from the radio network station to the user equipment and vice versa.

The user data are transferred in the form of complex data, referred to herein as IQ data, where "I" corresponds to the real or In-phase component of the complex signal and "Q" corresponds to the imaginary or Quadrature component of the complex signal. Several IQ data flows may be sent via one physical CPRI link, and each IQ data flow reflects the data of one antenna for one carrier, which is referred to as an antenna-carrier (AxC). One AxC is associated with the amount of digital user data for either reception or transmission of one carrier, e.g., a UTRA-FDD carrier at one independent antenna element. Stated differently, the AxC is the data to be transmitted on a specific frequency on a specific antenna. Since the CDMA method is used in this description, each AxC contains the information for multiple UEs superimposed on each other. In the example embodiment, the AxC "container" or time slot contains the user data (e.g., IQ samples) of the one AxC for one UMTS chip duration.

Layer 2 service access points (SAPs) are defined for the information planes or data flows and are used as reference points for performance measurements. These service access points shown in FIG. 4 are denoted as $SAP_{CM}$, $SAP_S$, and $SAP_{IQ}$. The single hop configuration in FIG. 4 shows a single link between the REC and the RE. The downlink direction is from the REC to the RE, and the uplink direction is from the RE to the REC. The REC includes a master port, and the RE includes a slave port.

Figure 5:
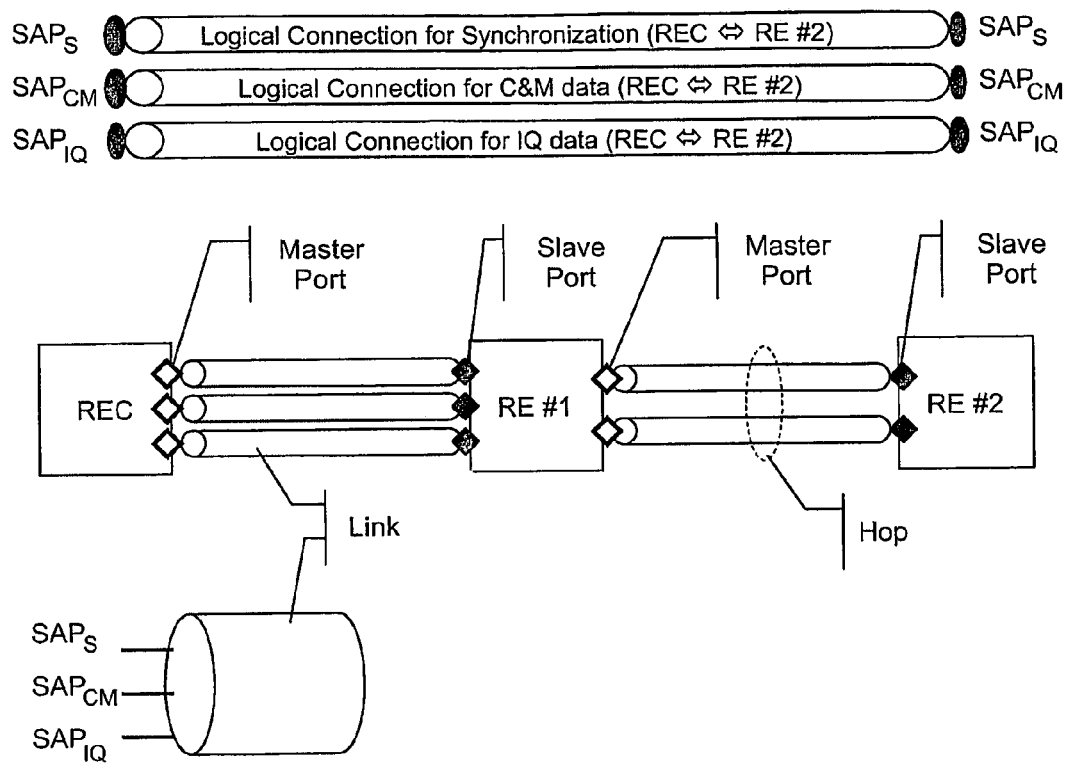
FIG. 5 shows an illustration of several defined terms.

A networked topology includes at least one intervening RE node. FIG. 5 shows examples of several defined terms useful in describing features or aspects of a networked topology, where the simplest networked topology includes an REC coupled to at least two REs with at least one of the REs being connected between the REC and the other RE. FIG. 5 shows such a simple networked topology with RE#1 being the networking RE. To facilitate descriptions of networked topologies, the terms master port and slave port are introduced. The sending port is a master port, and the receiving port is a slave port. The ports of the REC are always master ports. A RE has at least one slave port and has optionally other ports which can be slave or master. FIG. 5 illustrates several master and slave port examples.

The term "link" is used to indicate the bidirectional interface in between two directly connected ports, either between REC and RE, or between two REs, using one transmission line per direction. A working link consists of a master port, a bidirectional cable, and a slave port. Under normal conditions, a link has one master port and one slave port. For a link, the downlink direction is from a master to slave port, and the uplink direction is generally from a slave to master port. An active link, as shown in FIG. 5, supports "logical connections" (defined below) for synchronization, C&M data, and IQ data. A passive link does not support any C&M channel, i.e. it carries only IQ data and synchronization information, and may be used for capacity expansion or redundancy purposes.

A "hop" is the aggregation of all links directly connecting two nodes. A hop is defined either between REC and RE, or between two REs. A "multi-hop connection" is composed of a set of continuously connected hops starting from the REC and ending at a particular RE including cables and networking REs in between. An example is illustrated in FIG. 5.

FIG. 5 also shows that an REC may have multiple master ports and that an RE may have multiple slave and/or master ports. The RE includes an address table managed by its application layer that decides to which master port to route information received on a slave port to send that information on to the next node. Multiple ports may be used to support redundant links that can be used if a primary link is detected as faulty.

Figure 6:
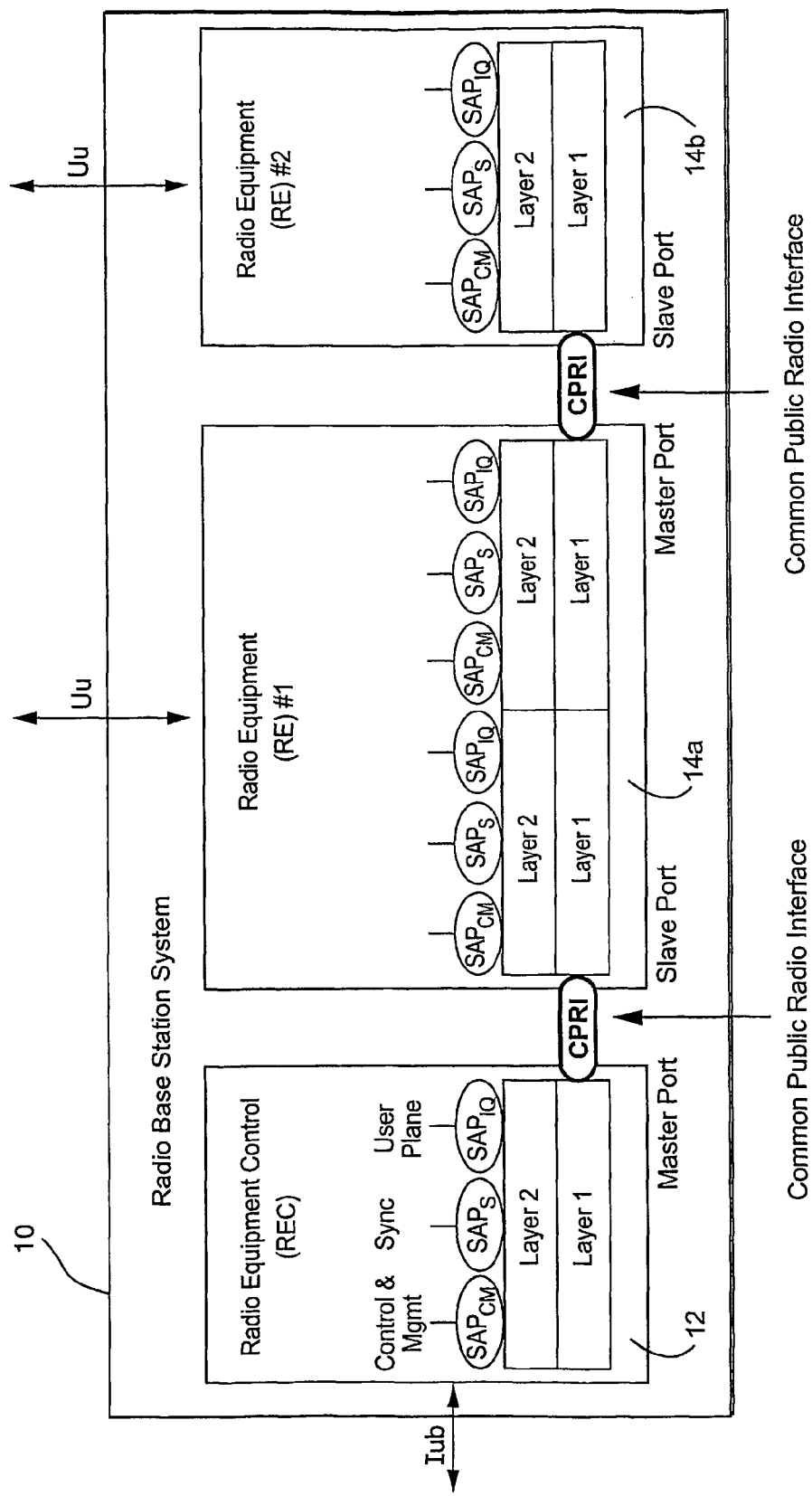
FIG. 6 illustrates a CPRI between an REC/RE#1 and between RE#1/RE#2 and various information flows or planes.

A "logical connection" defines the interconnection between a particular SAP (e.g., $SAP_{CM}$) belonging to a port of the REC and the corresponding peer SAP (e.g., $SAP_{CM}$) belonging to a port of one particular RE and builds upon a single hop or a multi-hop connection between the REC and that particular RE. Logical connections for C&M data (CM), user plane data (IQ), and synchronization (S) can be distinguished as is illustrated. Logical connections can be routed based on address routing tables in the FIG. 6 is similar to FIG. 4 and shows the system architecture for a simple "chain" networked topology. There is a common public radio interface between the REC and the first RE#1 labeled as 14a and a common public radio interface between the REC and the second RE#2 labeled as 14b. The intervening RE node has a set of SAPs for information transceived over its radio Uu interface and another set of SAPs for handling communicated with the second RE#2.

The rates over the transmission links between REC and RE#1 and between RE#1 and RE#2 can vary depending on the application. For example, a rate of transmission over the first transmission link is approximately otherwise on the order of 614.3 Mbit/s, 1228.8 Mbit/s, or 2457.6 Mbit/s. A rate of transmission over the first transmission link between REC and RE#1 may be the same as or different from the fate over the second transmission link between RE#1 and RE#2. As one non-limiting example, a rate of transmission over the first transmission link may be approximately twice the rate of transmission over the second transmission link.

Each antenna carrier has a corresponding time slot in the frame so that data samples for each antenna carrier are inserted in that antenna carrier's corresponding time slot, and wherein the corresponding time slot position in the frame can be changed from one position on the slave port of the first RE#1 to another position on the master port of the first RE#1.

Figure 7:
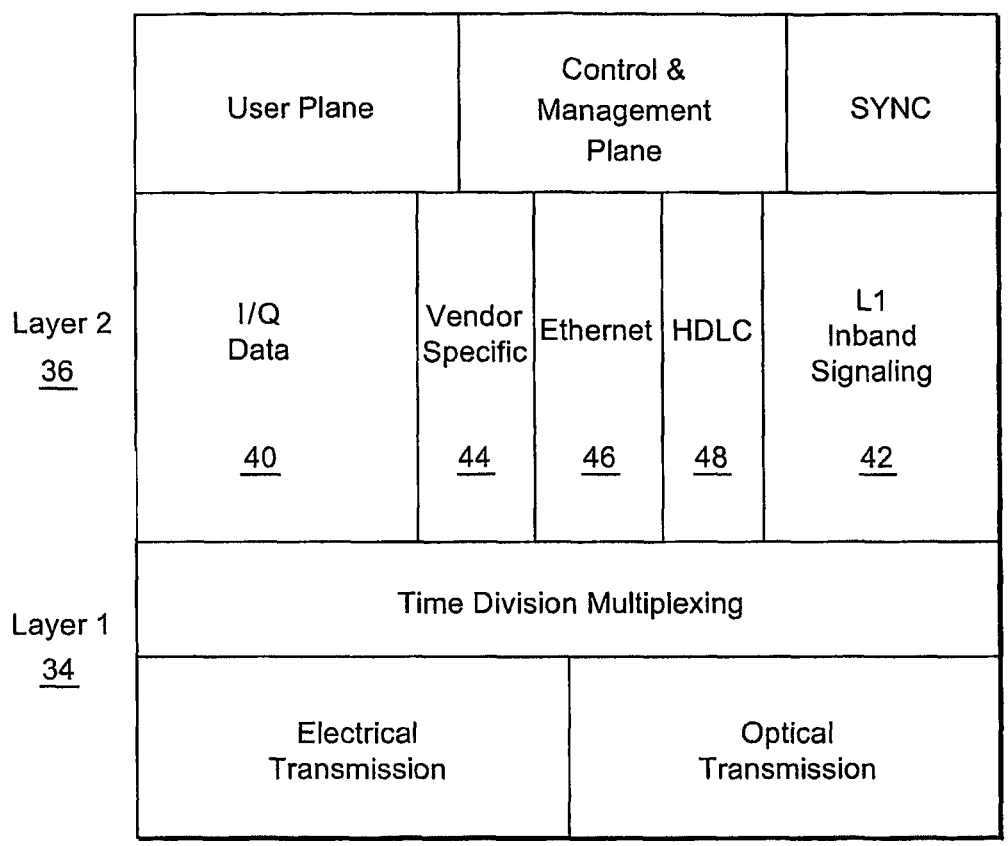
FIG. 7 shows a CPRI protocol overview.

FIG. 7 illustrates an overview of the CPRI protocol for the physical layer 34 (layer 1) and the data link layer 36 (layer 2). Layer 1 defines, e.g., electrical characteristics, optical characteristics, time division multiplexing of the different data flows, and low level signaling. Layer 2 defines the media access control, flow control, and data protection of the control and management information flow. The control plane involves control data flow used for the user plane control. The RE does not "know" anything about different calls being set up or released. The control plane typically sets the frequency and output power per AxC and reads measurements per AxC. The management plane carries management information for the operation, administration, and maintenance of the CPRI link and the radio equipment. The control and management data is exchanged between control and management entities in the radio equipment controller 12 and each radio equipment 14 and is provided to higher protocol layers. The control and management plane is mapped to a single control flow over the CPRI link.

The user plane includes data to be transferred from the radio base station to the user equipment and vice versa. As the method above, the user plane IQ data is represented by block 40 in FIG. 7. Several IQ data flows may be sent via one physical CPRI link, and again, each IQ data flow corresponds to the data for one antenna-carrier (AxC).

The synchronization plane transfers synchronization and timing information between radio equipment controller 12 and each radio equipment 14. Synchronization data is used for encoding (e.g., 8B/10B encoding) performed in the SERDES (Serializer/Deserializer) 76 and 86 shown in FIG. 8. The synchronization data is needed to align the deserializer at the receiving end to the serializer at the transmitting end. Synchronization data is also used to detect chip, hyperframe, and radio frame boundaries, and associated frame numbering as described below. The in-band signaling, depicted by block 42 in FIG. 7, includes information that is related to the physical REC/RE link for system startup, layer 1 link maintenance, and time critical information that has a direct time relationship to layer 1 user data. Block 44 represents an information flow reserved for vendor-specific information.

The IQ data of different antenna carriers are multiplexed by a time division multiplexing (TDM) scheme onto transmission links. The Control and Management (C&M) data are either sent as inband signaling (for time critical signaling data) or by layer 3 protocols that reside on top of appropriate layer 2 protocols. Two different layer 2 protocols—High Data Level Link Control (HDLC) 46 and Ethernet 48 are supported by the CPRI. The control and management data and the synchronization information are time-multiplexed with the IQ data.

Figure 8A:
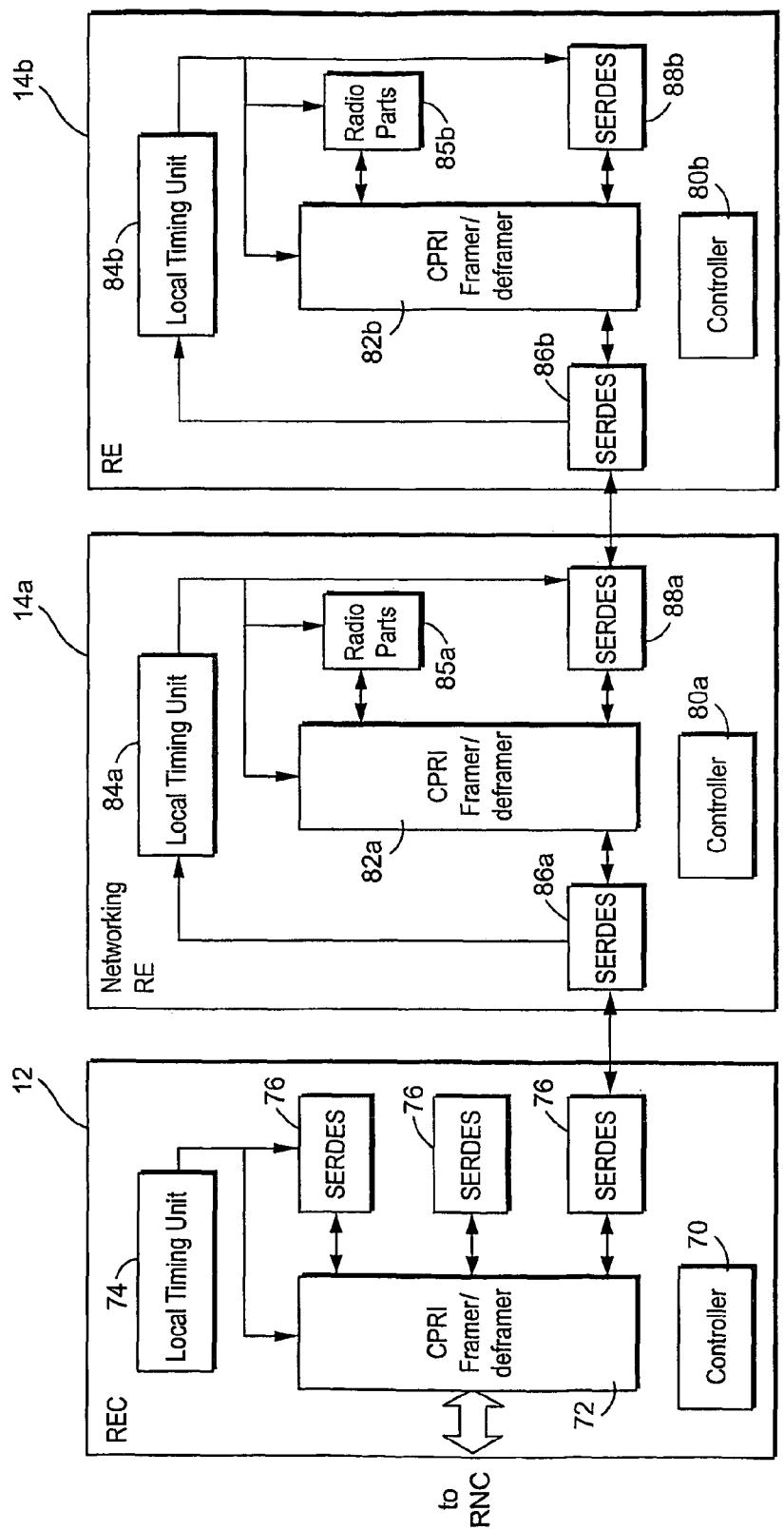
FIGS. 8A and 8B are function block diagrams showing certain functional elements in REC and networked REs.
Figure 8B:
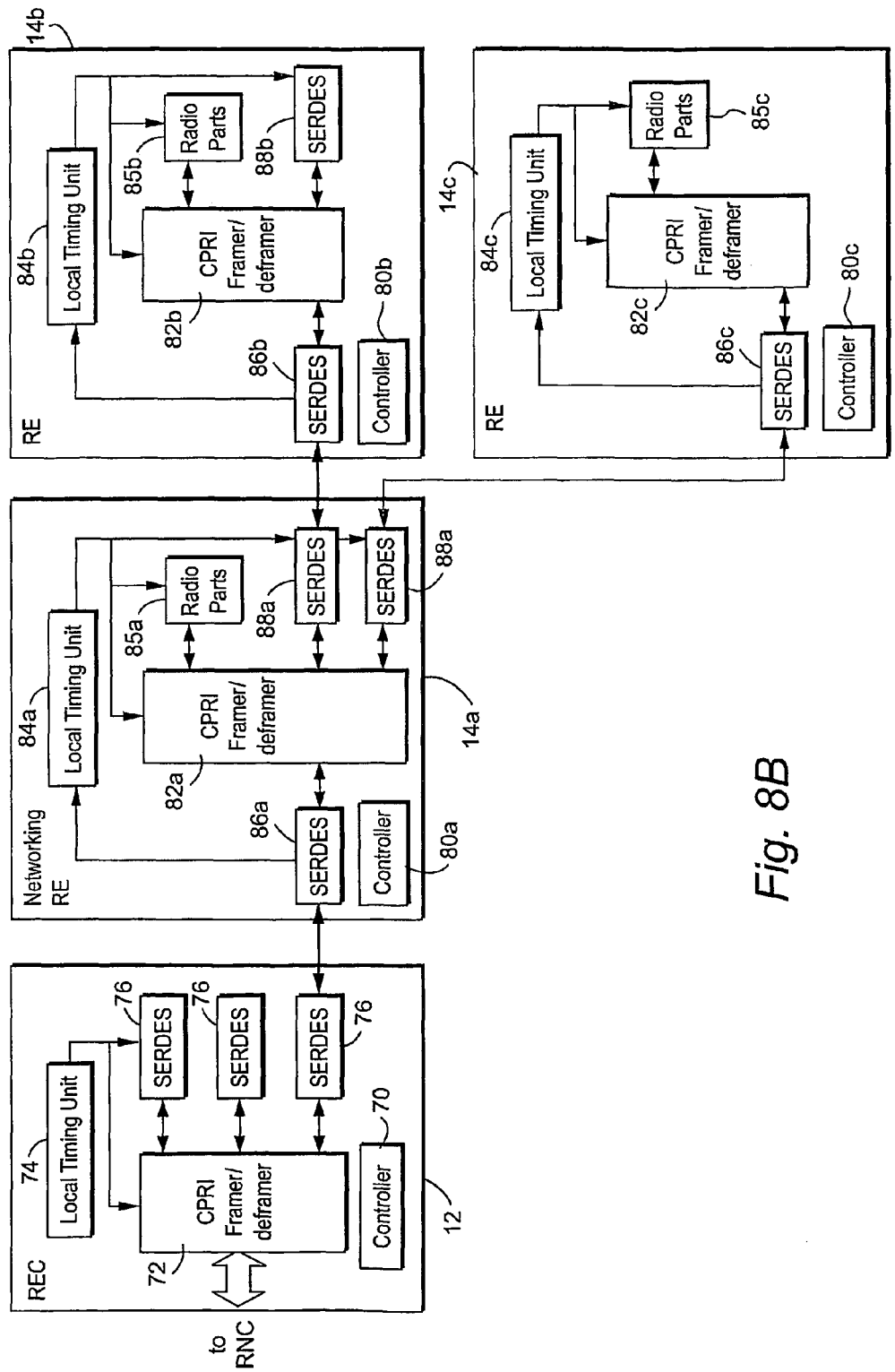

FIGS. 8A and 8B illustrate the REC and RE nodes in further detail in multi-hop configuration. FIG. 8A shows a simple chain configuration. The REC node 12 is managed by a controller 70, e.g., a CPU. A framer/deframer unit 72 is coupled to the controller 70. Each data flow corresponding to the data for one antenna of one carrier, i.e., one antenna-carrier (AxC), is provided to the framer 72 which multiplexes all data flows/AxCs, control and management information, synchronization information and layer one (L1) information into a particular frame structure, which is described in more detail below. The frame structure is then provided to a serializer/deserializer unit (SERDES) 76, and the SERDES 76 generates a serial stream on an output master port corresponding to the networking RE 14a. Similarly, information from each RE 14a and 14b is received on the master port, deserialized by SERDES 76, (i.e., put into parallel form), and provided to the deframer 72. The deframer 72 extracts and distributes to the appropriate SAP, the data flow, controller management, and layer 1 timing and maintenance information. A local timing unit 74 provides frequency and time references for the REC 12. The controller 70 also preferably performs timing delay determinations described later.

Each RE 14a and 14b has a similar structure and is managed by a controller 80a and 80b, respectively, e.g., a CPU. REs 14a and 14b includes CPRI framer/deframers 82a and 82b, respectively. The framer/deframers are coupled to respective radio parts 85a and 85b having or associated with plural antenna elements, where each antenna element receives a corresponding data flow. The framer/deframer 82a extracts control and management data and layer 1 maintenance data received from the REC 12 by way of the serializer/deserializer 86a for the networking RE 14a and provides it to the controller 80 over a control link not shown. The framer/deframer 82a extracts antenna carrier user data intended for the networking RE and forwards it to its radio parts 85a.

In the uplink direction, the framer/deframer 82a also combines control management data, layer 1 data, timing data provided by the local timing unit 84a, and data flow information in a frame structure. The uplink data flow information received from the radio parts 85a is multiplexed into the basic frame structure. The uplink frames are then transmitted to the REC 12 in serial form via the serializer/deserializer 86a over the first transmission link.

The framer/deframer 82a transmits on its master port via SERDES 88a the information intended for the next RE 14b. The RE 14b receives that information on its slave port via its SERDES 86b and passes that information onto its local timing unit 84b and to its framer/deframer 82b to perform similar operations that the networking RE 14a performs for information received intended for its own RE. Because the RE 14b does not have any RE connected to its master port, SERDES 88b is not used. In the uplink direction, the RE 84b sends user and control information including antenna carrier data from its radio parts 85b and C&M information from the controller 80b to the framer/deframer 82b. The framer/deframer 82b multiplexes and frames that information and forwards those frames via the SERDES 86b to the networking RE 14a over the second communications link. The networking RE 14a receives those frames from the end RE 14b in the master port for processing by SERDES 88a. The framer/deframer 82a processes the parallel formatted information from the SERDES 88a and includes it with it own uplink frames for delivery to the REC 12 via SERDES 86a and the first transmission link.

FIG. 8B shows another multi-hop configuration example. In this case, the tree configuration includes two "end" REs coupled to the networking RE 84a. The structure and operation of end RE 14c is similar to that for end RE 14b. The networking RE 84a also operates in similar fashion except that it must forward information to both end REs in the downlink and combine the uplink information from both end REs with its own uplink information for transmission to the REC 12.

The REC 12 regularly transmits a "time mark," generated by the REC's local timing unit 74, over the CPRI links that can be readily detected and recognized by each RE 14. The time mark at the outgoing or incoming interface port is used to relate time to a unique carrier instant on the interface. In the example implementation, the time mark is a K28.5, 10-bit symbol that is sent every ten milliseconds by the REC 12. When the time mark is received by each RE, the RE's local time unit 84 is set to a predetermined value, e.g., zero. In this way, each local RE's local time unit 84 is synchronized by "slaving" it to the timing mark generated by the REC's local timing unit 74. In networked topologies, an intervening RE forwards the timing mark to the next RE which performs the same synchronizing operation, and so on until the last RE node is synchronized to the REC timing mark.

Figure 11:
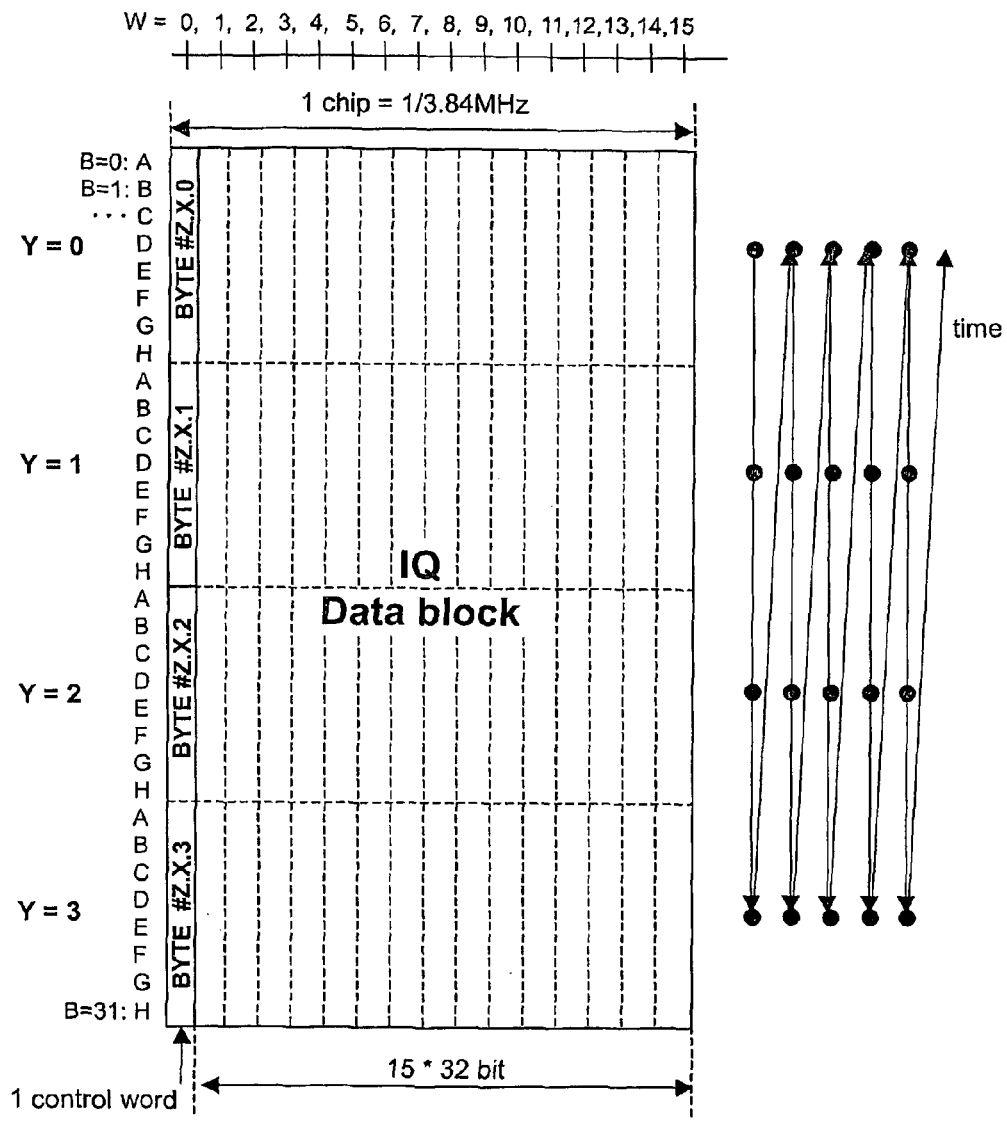
FIG. 11 shows a basic frame structure for a particular, example CDMA chip period and still higher CPRI line bit rate.

The TDMA information is carried over the CPRI interface in frames. In the non-limiting example implementation, the length of a basic frame illustrated in FIG. 9 is 1 WCDMA chip period→Tchip=1/3.84 MHz=260.416667 ns. A basic frame consists of 16 words with index W=0 ... 15. The word with the index W=0 is used as a control word (CW). The remaining words (W=1 ... 15), 15/16 of the basic frame are dedicated to the user plane IQ data shown in the figure as the IQ data block. The word length T depends on the total data rate, which is referred to as the CPRI line bit rate. Three alternative data rates, each with differing word lengths are available: 614.4 Mbit/s (length of word T=8); 1228.8 Mbit/s (length of word T=16), shown in FIG. 8; and 2457.6 Mbit/s, (length of word T=32) shown in FIG. 11.

Each word corresponds to an 8-bit byte. Each bit within a word in FIG. 9 can be addressed with the index B, where B=0 is the least significant bit and B=T−1 is the most significant bit. Each bit within a word in FIGS. 10 and 11 can be addressed with the index Y, where B=0 is the least significant bit of Y=0, B=7 is the most significant bit of Y=0, B=8 is the least significant bit of Y=1, etc. The transmission sequence of the bits is indicated on the right-hand side of FIGS. 9 to 11 with each ball representing a bit. After 8B/10B encoding, the ten code groups ("ABCDEI FGHJ") are transmitted as a serial data stream with bit "A" first. In 8B/10B encoding, one encoding bit is added to the three most significant bits, and another encoding bit is added to the five least significant bits.

Figure 12:
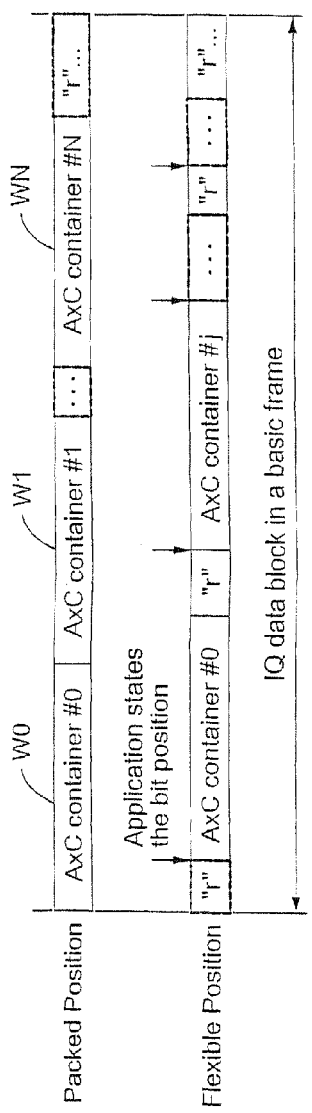
FIG. 12 shows packed and flexible multiplexing configurations for the frame structure.

An AxC container carries an IQ data block in the basic frame. It contains N IQ samples from the same AxC, where N is the oversampling ratio. IQ sample(s) are sent in an AxC container in accordance with either a "packed position" or a "flexible position" in the basic frame. Both are illustrated in FIG. 12. In the packed position, each AxC container in the basic frame is sent consecutively without any reserved bits in between and in descending order of AxC number. For the flexible position, a higher level application decides at what address in the IQ data block the first data bit of the AxC container will be positioned. Bits not used by an AxC container may be treated as reserved bits "r."

Figure 13:
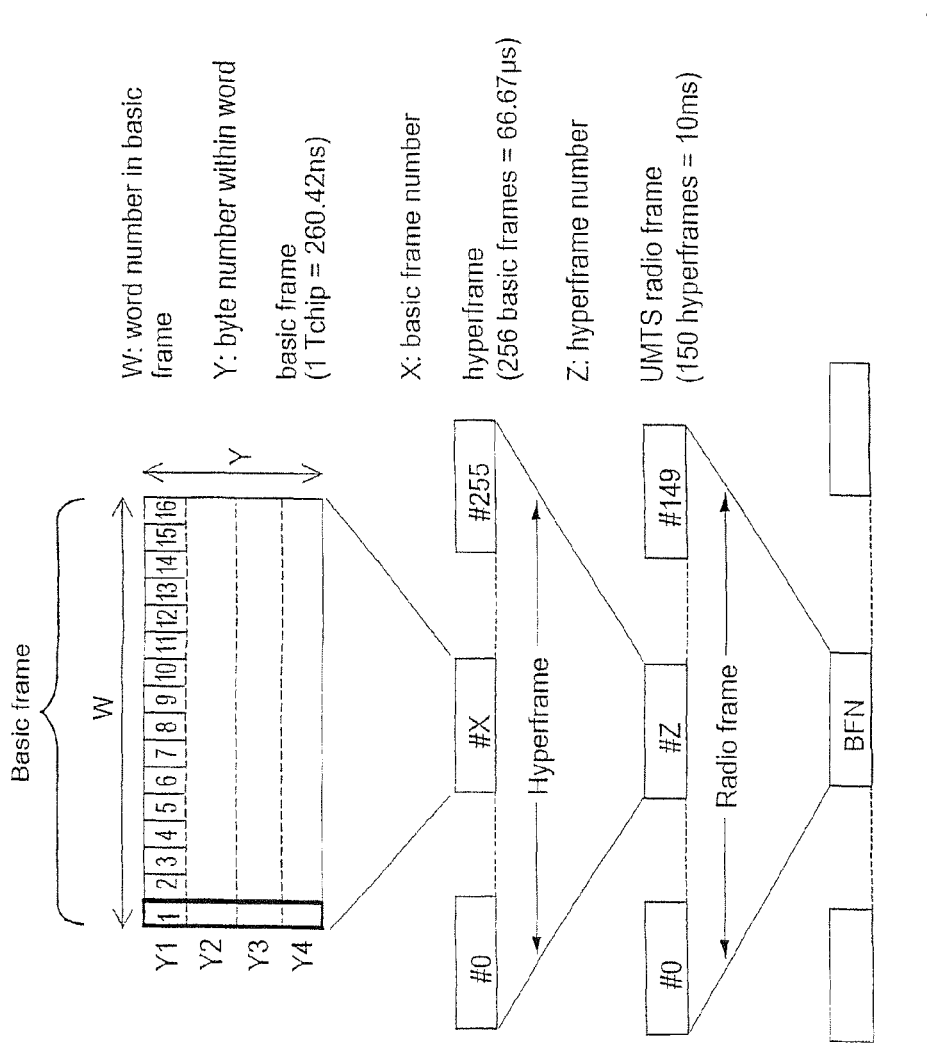
FIG. 13 shows the relationship between the basic frame, the hyperframe, and the UMTS radio frame in one, non-limiting, example embodiment.

FIG. 13 illustrates a hyperframe structure which is hierarchically embedded between the basic frame and the UMTs radio frame. "W" represents the word number in the basic frame, and "Y" represents the byte number within each word. Again, in this example implementation, the basic frame corresponds to a single chip period in UNITS. A hyperframe includes 256 basic frames, with the hyperframe number being designated by the variable X. 256 basic frames in the example implementation corresponds to 66.67 microseconds. 150 hyperframes are packed into a single UMTS radio frame, and in the example implementation, the UMTS frame is 10 milliseconds. Each hyperframe number is represented by the variable "Z." The hyperframe structure is used to multiplex the different control flows (and sub flows thereof) onto the control time slot. The smallest (in terms of bit rate) specified control flow is one control time slot per hyperframe. An example of a smallest control flow is the timing marker of the synchronization alignment flow (e.g., a K28.5 symbol). The choice of 256 basic frames as one hyperframe provides fine granularity in the allocation of bandwidth to different control flows and also simplifies implementation.

Figure 14:
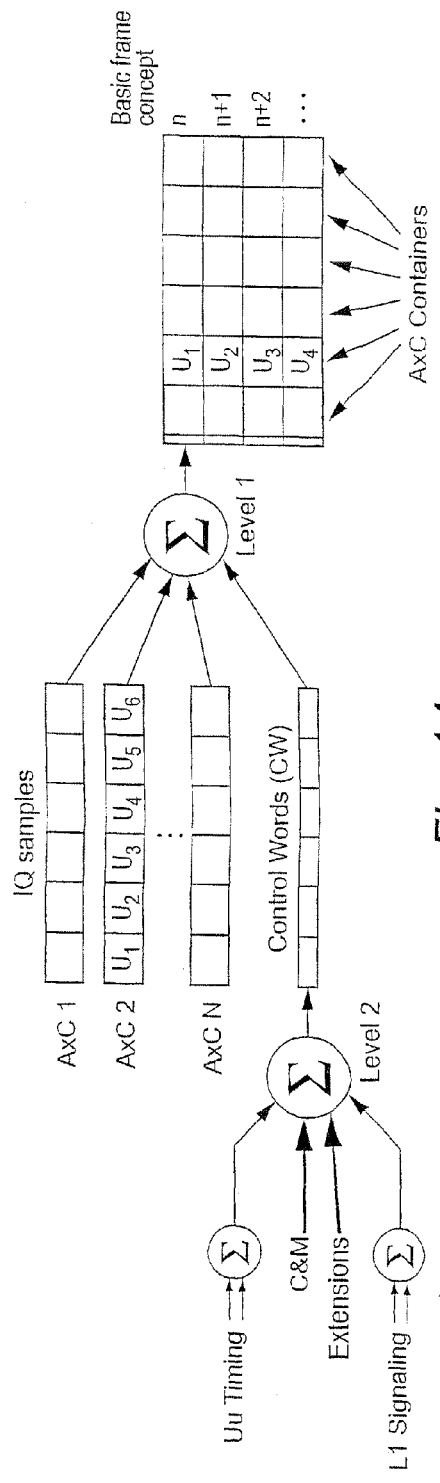
FIG. 14 shows conceptually how the framer/deframer in the REC and RE nodes multiplex both user information and control information into the frame structure.

The data control information are multiplexed together in the basic frame. FIG. 14 illustrates how multiple antenna carriers AxC 1 ... AxC N, each having multiple user data (IQ) samples $U_1$, $U_2$, ..., etc., are multiplexed with a series of control words (CW) at a first multiplexing level 1. In turn, each control word corresponds to various control information which has been multiplexed onto the control word stream at a second multiplexing level 2. The control information includes timing, layer 1 (L1) signaling, C&M information, and extension information. This corresponds to the logical multiplexing of the different control flows shown in FIG. 7. Still further, the different timing information and different layer 1 signaling may be multiplexed at a third level 3. This corresponds to a logical multiplexing of the different information within the SYNC and L1 inband signaling 42 shown in FIG. 7. Multiplexing of different applications onto the C&M plane is not shown in FIG. 14.

To clearly define the multiplexers in FIG. 14, the control words (CW) are preferably organized into subchannels. The level 2 multiplexer operates on the subchannels, and each of the four inputs allocates one or more subchannels. In the example implementation, 64 subchannels are defined. Each subchannel includes every 64th control word (CW). The first CW in a hyperframe belongs to subchannel 0. Each subchannel has 4 CWs within a hyperframe (CW0-CW3). Subchannel 0 has a CW in basic frame numbers 0, 64, 128 and 192 within the hyperframe. Subchannel 63 has a CW in basic frame numbers 63, 127, 191 and 255 within the hyperframe.

Figure 15:
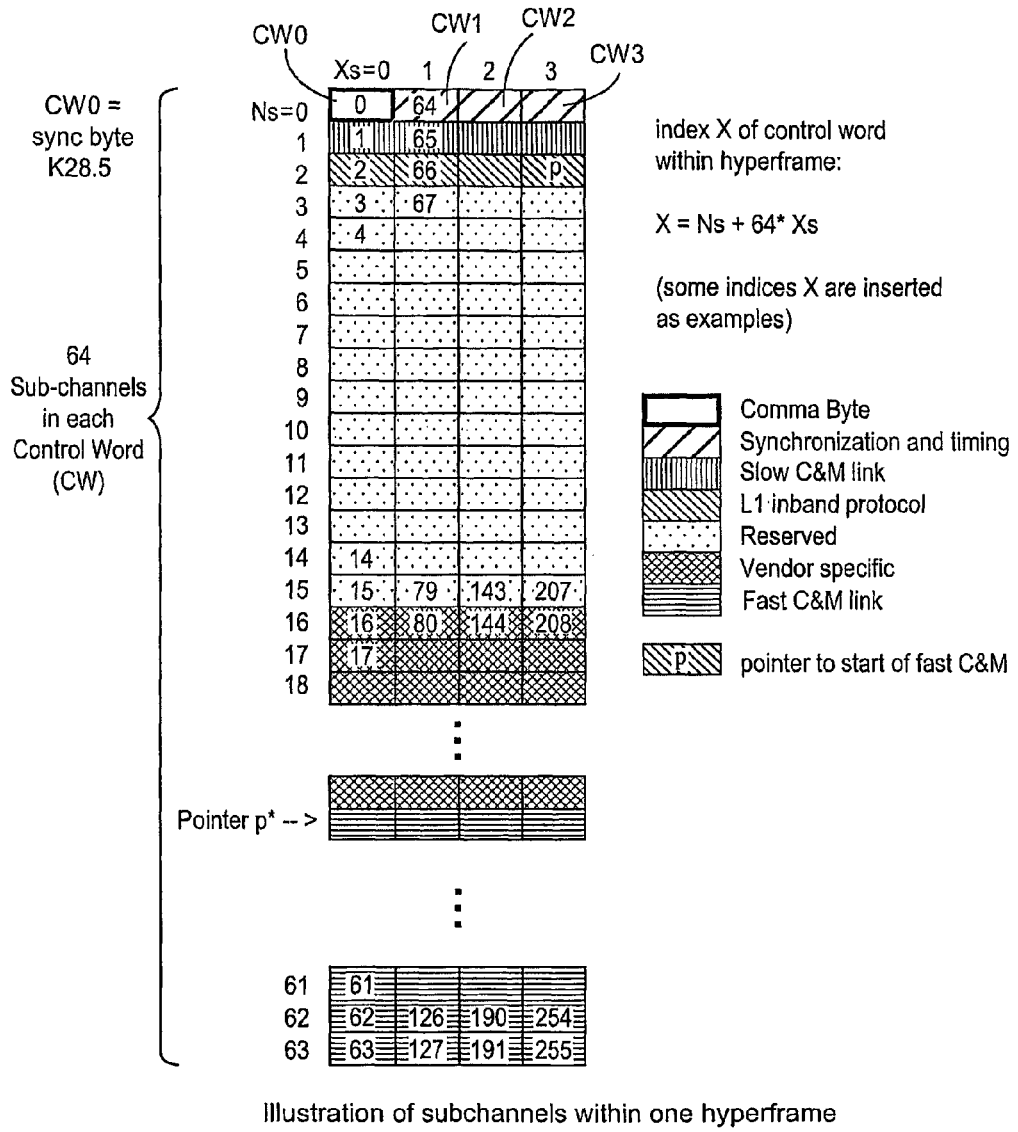
FIG. 15 illustrates an example control information sub-channel structure used in one, non-limiting, example embodiment.

This CW organization of a hyperframe is shown in FIG. 15. The index for the subchannels ranges from 0 to 63. The index (Xs) of a control word within a subchannel has four possible values—0, 1, 2, and 3. The index of the control word within a hyperframe is given by the following equation: X=Ns+ 64*Xs, where Ns is the word number in the hyperframe. The level 3 multiplexer of FIG. 14 works on the CW level multiplexing up to four sub flows onto one subchannel. The sub flows can be allocated in increments of one CW per hyperframe. Also, the level 3 multiplexer is aligned with the hyperframe start to simplify demultiplexing at the receiving end.

Figure 16:
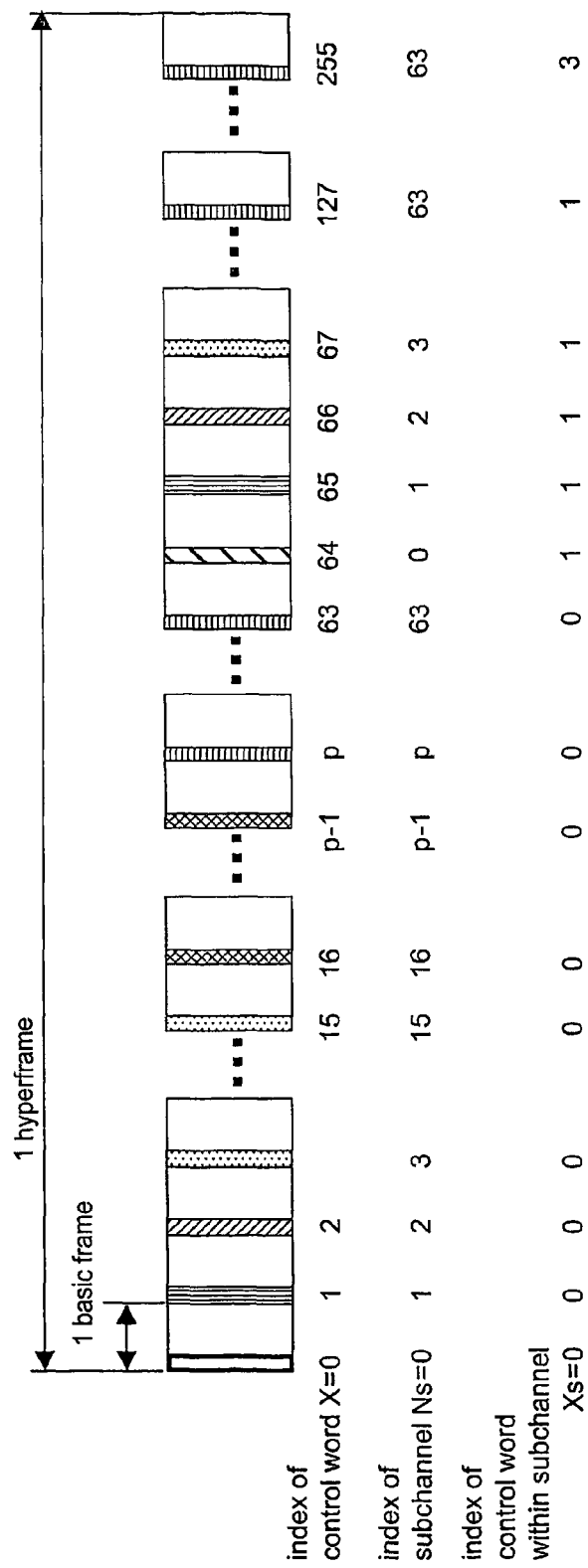
FIG. 16 illustrates control words and subchannels within one hyperframe in the one, non-limiting, example embodiment.

The organization of the control words in subchannels is illustrated in FIGS. 15 and 16. In FIG. 15, it is clear that the synchronization time mark, referred to in FIG. 13 as a sync byte, corresponds to the first control word/subchannel CW0 at Xs=0 and Ns=0. As described above, the synchronization and timing between the REC and the RE are achieved by the RE detecting the sync time mark contained in this control word. The time mark at the beginning of every hyperframe may be a unique but known symbol (an example is described below). Subchannel 1 includes the slow C&M link, where the slow C&M link is based on HDLC and has a bandwidth of 0.24, 0.48, or 0.96 Mbps at 1228.8 line bit rate. The slow C&M link includes HDLC frames carrying protocol layer L2+ messages. Subchannel 2 includes layer 1 in-band protocol information including the interface version, the slow C&M link bit rate (if present), L1 control (e.g., reset of RE, SAP usage, etc.), the L1 status (signal presence and quality, end-point fault, etc.). The last control word of subchannel 2 includes a pointer "p" which points to the address/index of the start of fast C&M link, which in this example, is a subchannel number, somewhere in the range between 18 and 61. The slow C&M link includes Ethernet frames carrying L2+ messages. The fast C&M which uses Ethernet has a bandwidth of 0.96 mbps*N at 1.22.8 line bit rate, where N is the number of subchannels allocated. Subchannels 3-15 are reserved for frame or other uses, and subchannels 16 up through the pointer subchannel for the fast C&M include vendor-specific information. The vendor specific subchannels allow for add-ons to the protocol to achieve product differentiation. In addition to the sync byte, subchannel 0 also carries the hyperframe number (HFN in CW 1) and the node B Frame Number (BFN in CW 2 and CW3). The BFN identifies a radio frame in the radio signal sent over the air interface.

FIG. 16 illustrates control words and subchannels within one hyperframe. The BFN changes every 150 hyperframes/one radio frame. To quickly synchronize to the radio BFN frame structure, the hyperframe number (HFN) is transferred over the radio Uu interface. The RE can determine the radio interface (e.g., Uu) frame structure after receiving one hyper frame. The current BFN is transferred in whole, and the offset within the radio frame at the start of the received hyperframe is [HFN (received)/150] of a radio frame.

The L1 signaling transfers a Service Access Point (SAP) Defect Indicator (SDI) bit or the like. The SDI bit (when not set) indicates that higher protocol layers (L3 and above up to the application layer) are available and operational on the C&M logical connection, synchronization logical connection, and IQ data logical connection. If the transmitting TDM framer in either the REC or an RE detects that at least one of the logical connection is missing (a fault scenario), the SDI bit is set. Upon detecting a set SDI bit, the receiving node stops interpreting the C&M, the synchronization, and IQ logical connections and enters a "safe state."

The fast signaling of a defective link is important because a faulty IQ logical connection or synchronization logical connection may cause transmission of radio signals that do not comply with regulatory requirements. A faulty C&M logical connection may further hinder reconfiguration which in turn can also break such regulatory requirements. Of course, other indicators may be sent to accomplish one or more of these functions.

Most of the L1 signaling, such as loss of signal (LOS), loss of frame (LOF), remote alarm indication (RAI), etc., is on a per-hop basis and indicates the failure of the interface. These L1 signals are read in each RE by its application and signaled to the REC via the application layer. But layer 1 SDI signals are an exception as the interface is still functioning but the transferred data is temporarily invalid. For an intervening RE with only one CPRI slave port, the SDI bit is forwarded to the slave port of a next RE. Receiving the SDI informs the next RE that, although the interface is still functioning, the data being transferred is invalid and should be discarded. An SDI bit received on a CPRI master port is read by the application in the RE and signaled to the REC via the application layer. The RE should not use a faulty link for which the SDI is set for any of the CPRI service access points: IQ, sync, or C&M. Preferably, the RE should prevent any transmission over the radio interface from this faulty link.

For link failures, redundant links may be available. Redundancy may exist on a single hop level by using more than one link. Redundancy may also exist on network level. An RE can be connected to the REC through more than one logical connection, each logical connection having its own network path. If there are redundant ports by which an RE and the REC may be linked, then the RE may interpret a set SDI such that the information on that link is no longer usable. If redundant information exists, it will be routed instead. But if no redundant information exists, the SDI bit is forwarded to the next RE or the REC.

Another L1 signal that is not handled on a per-hop basis is a reset signal. The reset function is important but it must also be robust in the sense that false reset triggers should be avoided. The reset notification is sent from a master port to a slave port. A reset acknowledgement is sent from a slave port to a master port. When the master wants to reset a slave, it sends the reset signal for at least a predetermined number of hyperframes (e.g., 10), to minimize false resets. On the reception of a valid reset notification, the slave sends the reset acknowledgement for at least a predetermined number of hyperframes on the same link, e.g., 5. When an RE receives a valid reset notification on any of its slave ports, the RE resets itself and also forwards the reset notification on all its master ports by for at least the predetermined number of hyperframes, e.g., 10. In this way, robust resetting of each RE in the network is ensured.

The TDM structure requires that both the transmitting node REC/RE and the RE/REC receiving node correctly know when a hyperframe starts. As a result, the receiving node must be able to detect the first basic frame of a hyperframe, the first octet or byte of the first basic frame, and the first bit of the first byte. All three synchronization levels are achieved by sending a unique, known symbol as the first word in a hyperframe. One example is a K28.5 symbol which is an 8B/10B code having a total of 10 bits. Two of those bits are redundant bits used for error detection and/or correction. Of course, other known symbols could be used. One-fourth of the control subchannel 0, namely, the first control word $X_0$ may be used to transfer the K28.5 symbol to reduce complexity. Using the K28.5 symbol, the RE achieves clock and data recovery. By initially transmitting the K28.5 symbol, the REC defines word borders in the hyperframe. If the receiving node loses data recovery during operation, additional K28.5 symbols are transferred. As a result, the CPRI interface is self-synchronizing on all levels without the need for feedback from the RE of clock and data recovery status. Nor are special actions needed to regain synchronization other than normal operation of the interface.

The start-up of the CPRI interface requires minimal start-up information at the REC and RE nodes, i.e., start-up is plug-and-play. This is particularly desirable when radio base stations are deployed in large numbers. The start-up procedure must accomplish L1 synchronization bit alignment and hyperframe alignment. During start-up, the REC and the RE (or an RE and another RE) negotiate 3 interface characteristics: the line bit rate of the interface, the protocol revision, and the C&M link characteristics. Since there is no mandatory line bit rate or C&M link characteristics, the REC and REs must, during the start-up procedure, try different configurations until a common match is detected. The common match does not have to be optimal. Instead, the first common match permits an exchange of capabilities of a proper configuration to be used in the following communications.

Figure 17:
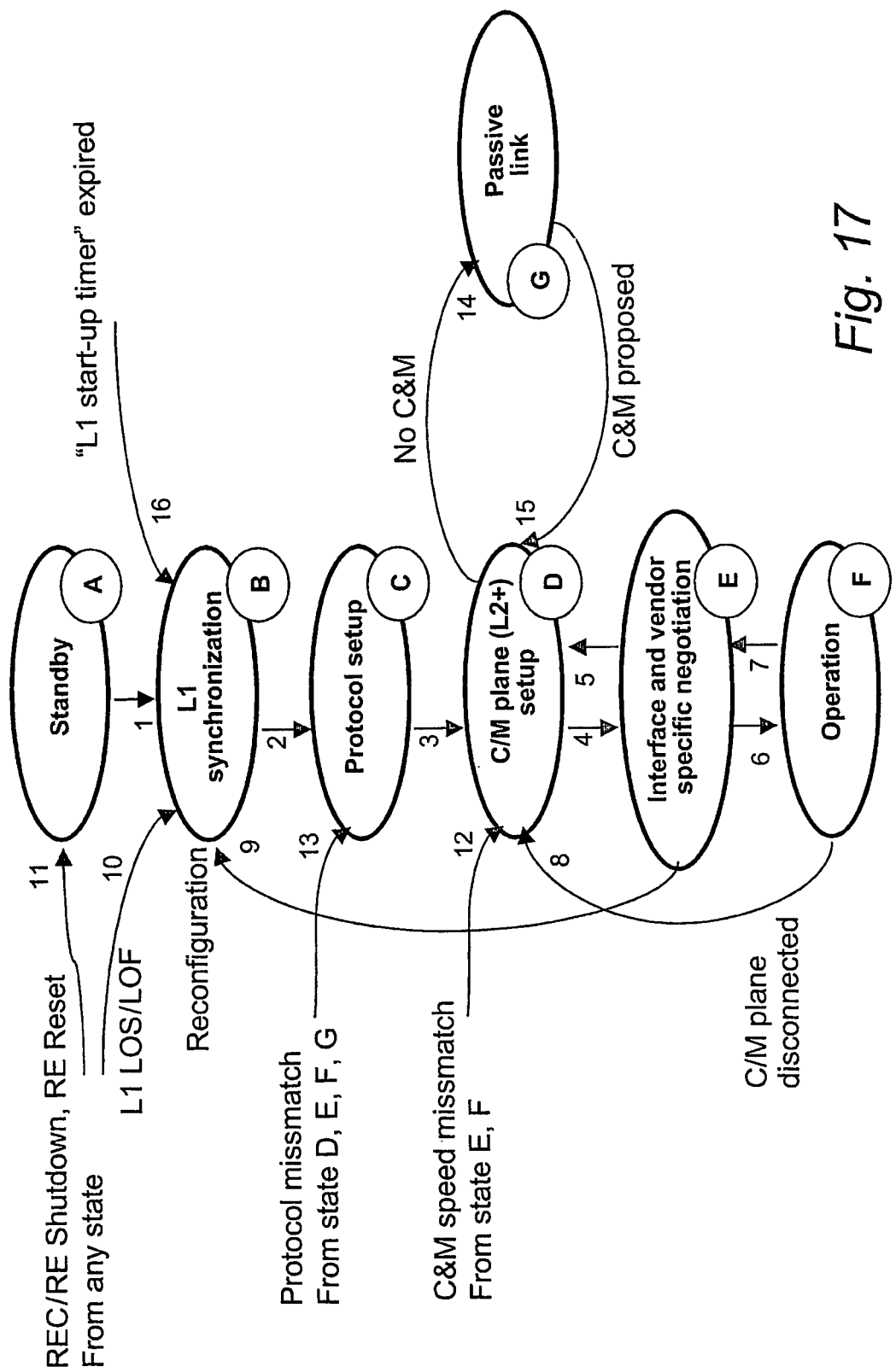
FIG. 17 is state diagram illustrating example start-up procedures between an REC and an RE.

FIG. 17 illustrates start-up state diagram showing various start-up states and transitions. Although described in the context of a start-up between the REC and an RE, the same procedures may be applied for a start-up between to REs. During the stand-by state, there is no transmission or reception over the CPRI. An operator may designate a suitable start-up configuration including line bit rate, C&M link characteristics, etc. The REC and the RE may also have knowledge about a previous successful configuration. In state B, called "L1 synchronization, and rate negotiation," both REC and RE reach layer 1 (L1) synchronization, and the line bit rate of the interface is determined. The REC starts to transmit over the CPRI at the highest available bit rate when first entering the L1 synchronization state and also attempts to receive over the CPRI from the RE at the same line bit rate. If the REC does not reach synchronization, (i.e., the REC does not receive (1) K28.5 symbols at the proper repetition rate—1 per hyperframe—along with (2) an incrementing HFN), it selects another line bit rate after a time interval T1, where the time interval T1 may be, for example, 0.9-1.1 seconds. Following each T1 interval, a new line bit rate for reception and transmission is selected, assuming that one is available. The line bit rates may be selected from the available set in a round robin fashion, i.e., the first highest, the second highest, ..., the slowest, and restarting from the highest line bit rate.

The RE attempts to receive over the CPRI at the highest available line bit rate when first entering the L1 synchronization state. If the RE does not reach synchronization, (i.e., the REC does not receive K28.5 symbols at the proper repetition rate—1 per hyperframe—along with an incrementing HFN), it selects another line bit rate after a T1' interval, where T1' may be, for example, between 3.9-4.1 seconds. Following each T1' interval, a new reception line bit rate selected for reception assuming that one is available. Again, the line bit rates may be selected from the available set in a round robin fashion. When the RE reaches synchronization, it starts to transmit over the CPRI interface to the REC at the same line bit rate that it successfully received at. At this point, layer 1 is synchronized with both uplink and downlink hyperframe structures aligned.

After successful completion of L1 synchronization and line bit rate negotiation, the next start-up state is protocol setup. During this state, a common protocol version of CPRI is determined. If one or both of the REC and RE can use multiple revisions of the CPRI interface, a common revision must be found before trying to extract the conveyed C&M link. Otherwise, the layer 1 signaling (and thus information about possible C&M links) cannot be interpreted. The REC and RE negotiate as follows: each node proposes the highest protocol revision that it supports. The node with the proposed highest revision steps back to the same revision as the other node (if possible) or proposes another revision, lower than the other node's (if possible). If one node proposes a revision lower than the lowest revision supported by the other node, no common protocol is available, and the start-up fails. If both nodes propose the same revision, the start-up proceeds using that proposed protocol revision.

After layer 1 synchronization and protocol version agreement, the start-up moves to state C&M plane (L2+) setup to determine a common C&M link bit rate. Negotiations proceed in parallel for the fast C&M link and the slow C&M link. For both links, each node proposes the fastest possible bit rate it supports, i.e., the fastest bit rate supported for fast C&M and the fastest bit rate supported for slow C&M. The unit with the highest proposed bit rate steps back to the bit rate proposed by the other node (if possible) or proposes another bit rate lower than that proposed by the other node (if possible). Of course, if no common C&M fast and slow bit rates are found, the start-up fails. If neither the fast or slow C&M link is set-up, the CPRI interface is a "passive link," which can be used in parallel with another interface with has a C&M link, e.g., when the C&M carrying interface does not have enough space for all AxCs to be transferred. The passive link state is shown in FIG. 17.

If the fast and slow C&M link speeds are agreed, the start-up proceeds to a vendor-specific negotiation state. During this state, the higher level applications in the REC and RE negotiate the CPRI usage. This specific information exchange about capabilities and capability limitations results in a preferred configuration of the CPRI based on a vendor-specific requirements. At this point, the start-up is complete and normal operation commences.

Figure 18:
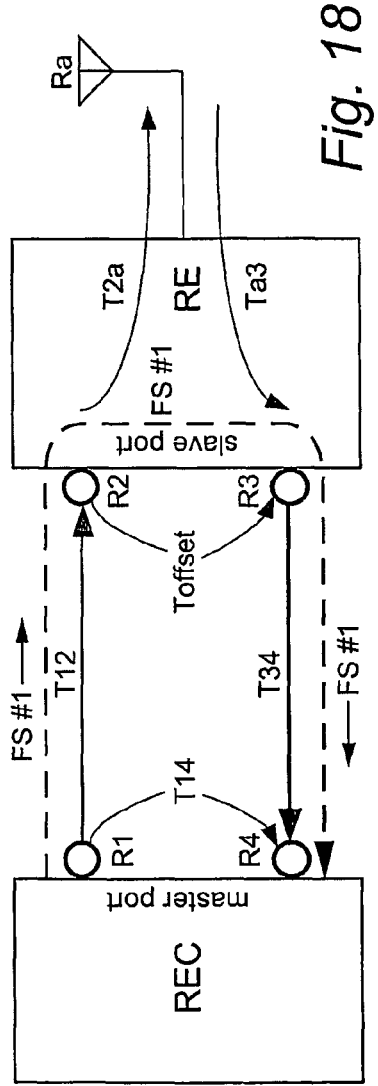
FIG. 18 is a diagram to identify various time delays and offsets between the REC and RE.

Related to synchronization is the issue of calibration/compensation for delays associated with the CPRI interface. The CPRI provides a mechanism to calibrate the delay between the REC and RE and the round trip delay on multi-hop configurations. Specific reference points for delay calibration and timing relationships between input and output signals at the RE are defined as shown in FIG. 18. The definitions and requirements are described below for a link between REC and an RE, but they also apply for links between two REs if the master port of the REC is replaced by a master port of an RE.

Figure 20:
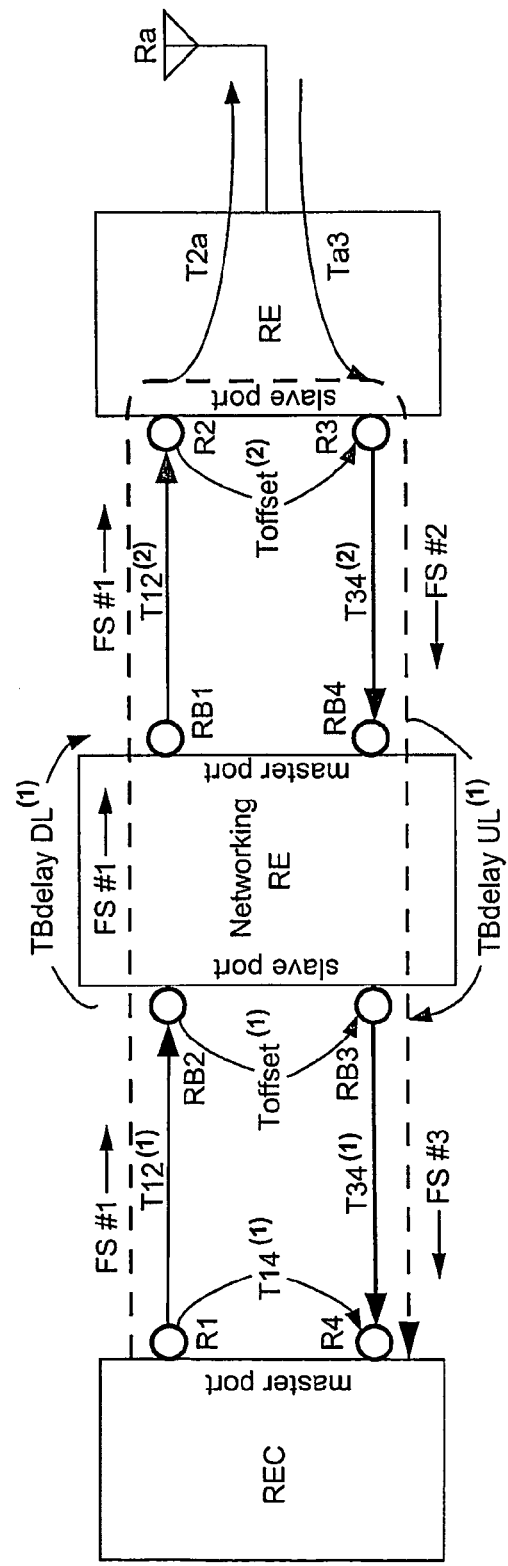
FIG. 20 is a diagram to identify various time delays and offsets between the REC and two cascaded REs.

The reference points R1-R4 for cable delay calibration are the input and output points of the equipment as shown in FIGS. 18 and 20. Reference points R1-R4 correspond to the output point (R1) and the input point (R4) of the REC, and the input point (R2) and the output point (R3) of an RE terminating a particular logical connection between $SAP_{IQ}$. The antenna is shown as "Ra" for reference. Reference points RB 1-4 in the networking RE example shown in FIG. 20 correspond to the input point (RB2) and the output point (RB3) of the slave port and the output point (RB1) and the input point (RB4) of the master port.

A dashed loop is shown in FIGS. 18 and 20 corresponding to an REC-to-end-RE loop. It is useful to determine delay associated with the REC-to-end-RE loop for two reasons: (1) to determine a downlink delay from the REC to each RE, which is needed to synchronize the radio/air interface communications for each RE, and (2) determine the uplink delay of the IQ data from each RE to the REC.

Each RE uses the incoming frame sync (FS) corresponding to the K28.5 symbol of the hyperframe with HFN=0 at its slave port as its synchronization source (i.e., slave ports RB2 and R2, respectively, in the examples shown in FIG. 18 and FIG. 20) and as RE's timing reference. The single-hop case is explained using FIGS. 18 and 19, and the multi-hop case is explained using FIGS. 20 and 21.

Figure 19:
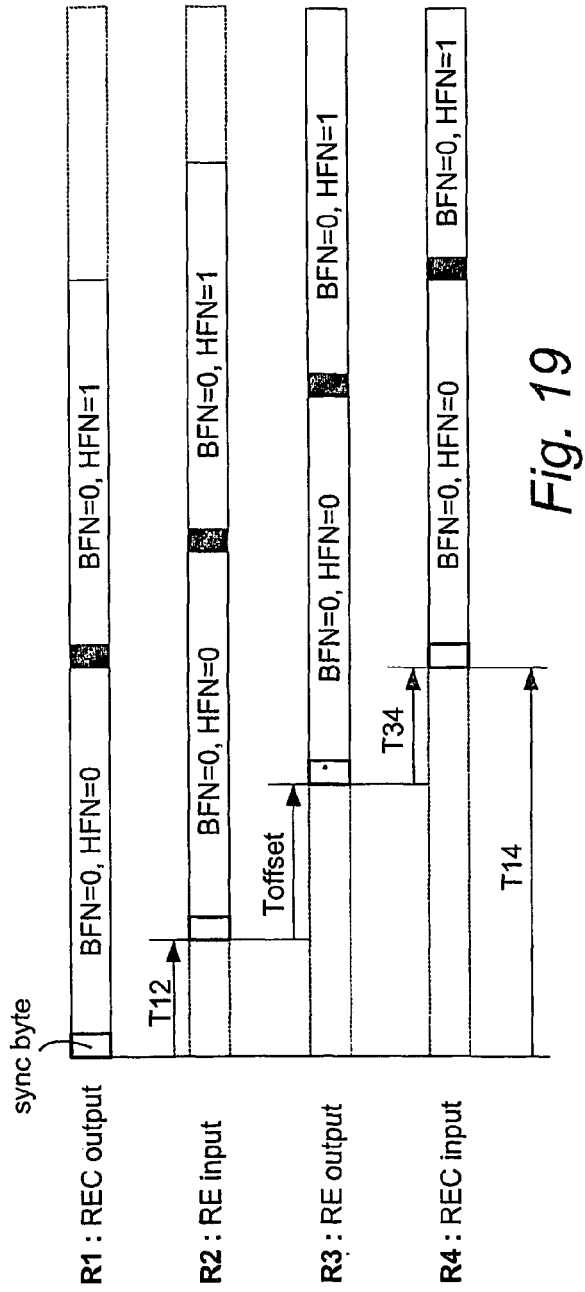
FIG. 19 shows the input and output information at each port shown in FIG. 16 in time.

FIG. 19 shows the relationship between downlink and uplink frame timing. T12 is the delay of the downlink signal from the output point of REC (R1) to the input point RE (R2). T34 is the delay of the uplink signal from the RE output point (R3) to the REC input (R4). Toffset is the frame offset between the RE input at R2 and the RE output signal at R3. The RE determines Toffset. Toffset is either known in advance, or it is measured using the FS #1 transmitted from R1 by the REC. Toffset is the time between receiving the FS #1 at R2 to transmitting the FS #1 at R3 back towards R4. This fixed offset (Toffset) is an arbitrary value which is greater than or equal to 0 and less than $256*T_c$, which in this UMTS example is 66 μsec. T14 is the frame timing difference, (the REC-RE loop delay), between the transmission of the FS #1 from R1 and receipt of the FS #1 at R4 as measured by the REC. The delays T12 and T34 are assumed to be the same so that T12=(T14−Toffset)/2. Having T12 provides the downlink delay from the REC to each RE, which is needed to synchronize the radio/air interface communications for each RE. Having T34 provides the uplink delay of the IQ data from the single RE to the REC.

Referring now to FIG. 20 for the multi-hop configuration, each RE again determines its Toffset value as in the single hop case and sends it to the REC. This fixed offset (Toffset) is an arbitrary value which is greater than or equal to 0 and less than 256*$T_c$. Different REs may use different values for Toffset. F Assuming the CPRI interface delay in the uplink and downlink direction are equal, the interface delay can be determined by each node measuring the difference, Toffset, between the transmitted and received hyperframe structure. The RE reports the difference Toffset to the REC as Toffset RE. The round-trip delay can be calculated as follows: round-trip delay=Toffset REC−Toffset RE. The one-way delay is approximately one-half the round-trip delay. To simplify the delay measurement of long cables, (e.g., delay>one hyperframe/2), the RE generates its transmitted hyperframe number based on the received hyperframe number. The Toffset RE is therefore between 0 and 1 hyperframes long.

Figure 21:
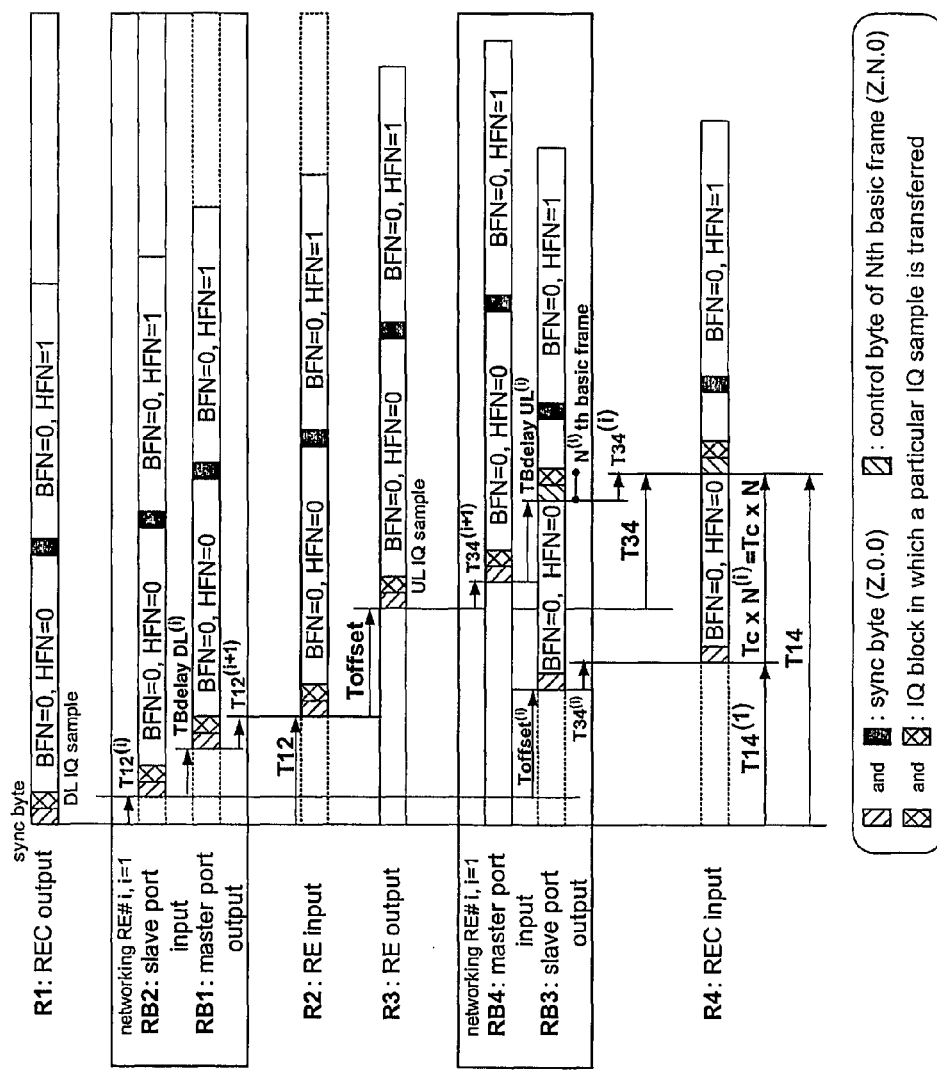
FIG. 21 shows the input and output information at each port shown in FIG. 20 in time.

FIG. 21 shows the relation between downlink and uplink frame timing for the multi-hop configuration example shown in FIG. 20. The end-to-end delay definitions (T12, T34 and T14) and the frame timing offset (Toffset) for a multi-hop connection are the same as those of the single-hop connection. Each networking RE and end RE provides the REC with a time offset (Toffset$^{(1)}$ and Toffset$^{(2)}$). Each networking RE, having both slave and master ports, also determine and reports the delay TBdelay DL$^{(1)}$ between the slave to master port in the downlink (e.g., RB2-RB1 in FIG. 20). This delay TBdelay DL$^{(1)}$ is determined by finding the time difference between when the frame sync #1 (FS #1) is received on the slave port RB2 and when it is transmitted on the master port RB1. In essence, delay TBdelay DL$^{(1)}$ is the downlink forwarding delay for the networking RE.

The networking RE also reports to the REC the forwarding delay TBdelay UL$^{(1)}$ between the master to slave port in the uplink (e.g., RB4-RB3 in FIG. 20). But this uplink forwarding delay TBdelay UL$^{(1)}$ is determined in a different manner than the downlink forwarding delay TBdelay DL$^{(1)}$ because while the downlink forwarding delay TBdelay DL$^{(1)}$ is constant, the uplink forwarding delay TBdelay UL$^{(1)}$ is not. This is because the frame sync FS#1 on the downlink is strictly defined and simply forwarded by the networking REs. But that is not the case with the uplink because the uplink frame structure is more loosely defined and is defined per hop. As shown in FIG. 20, the hop between the end RE and the network uses a frame sync #2, and the hope between the networking RE and the REC uses a frame sync #3. The difference between each uplink frame sync is anywhere between 0-66 μsec in this non-limiting example. In other words, FS #2 is sent within 66 μsec of the end RE receiving FS #1, and FS #3 is sent with 66 μsec of the networking RE receiving FS #2.

The remapping of the data samples from RB4 to RB3 is expressed as "N", which corresponds to the basic frame number on RB4 holding the data sample from the basic frame #0 on RB3. This includes both the relationship between incoming and outgoing FSs as well as the internal processing delay of the networking RE. That delay is denoted as a whole number of basic frames. The actual FS delay through the networking RE from RB4 to RB3 thus is determined as follows:

$$ULdelay^{(1)} = (TBdelayUL^{(1)} - Tc*N^{(1)})$$

The REC-RE loop delay is then determined from the following two equations:

$$T14 = T12^{(1)} + Toffset^{(1)} + T34^{(1)} \text{ (to first } RE\text{)} \quad (1)$$

$$T14 = T12^{(1)} + TBDelayDL^{(1)} + T12^{(2)} + Toffset^{(2)} + T34^{(2)} + ULdelay^{(1)} + T34^{(1)} \quad (2)$$

where equation (1) is the REC-networking RE loop delay and equation (2) is the REC-end RE loop delay. Assuming that T12$^{(1)}$=T34$^{(1)}$ and that T12$^{(2)}$=T34$^{(2)}$ (equal length cables with usual two fibers per cable), then:

$$T14 = 2*T12^{(1)} + Toffset \quad (3)$$

$$T14 = 2*T12^{(1)} + 2*T12^{(2)} + TBdelayDL^{(1)} + TBdelayUL^{(1)} - Tc*N^{(1)} + Toffset^{(2)} \quad (4)$$

Equations (3) and (4) are two equations with two unknowns (T12$^{(1)}$ and T12$^{(2)}$), which can thus be solved so that the cable delays between REs can then be determined. With this information, the downlink delay from the REC to each RE may be determined for use in synchronizing the air interface of each RE. Similarly, this information may be used to determine the uplink delay the IQ data will experience from each RE to the REC.

The invention can be practiced in a wide variety of implementations and embodiments, and is not limited to the CPRI examples described above. Further details of these particular CPRI example implementations are provided in the CPRI specification v.2.0 described in the U.S. provisional patent application U.S. provisional patent application No. 60/617, 084, the contents of which are incorporated herein by reference.

While the description includes various example embodiments, it is to be understood that the claims are not to be limited to them. On the contrary, the claims are intended to cover various other embodiments, implementations, modifications, and equivalent arrangements. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

What is claimed is:

1. A method for use in a distributed radio base station including a radio equipment controller (REC) that performs baseband processing for the distributed radio base station and first and second radio equipments (REs) that each perform radio frequency functions for the distributed radio base station including transceiving information over a radio interface using multiple antenna carriers, the REC being separate from and coupled to the first RE by a first transmission link and the first RE being separate from and coupled to the second RE by a second transmission link, comprising the steps of:

generating control information and user information for transmission over the first transmission link from the REC of the distributed radio base station to the first RE of the distributed radio base station and over the second transmission link from the first RE to the second RE of the distributed radio base station, the user information including multiple data flows, each data flow corresponding to data associated with one antenna for one radio carrier;

formatting the control information and user information into multiple time division multiplexed (TDM) frames, where each TDM frame includes a control time slot for the control information and multiple data time slots for the user information and each data time slot corresponds to a data flow of one of the antenna carriers;

transmitting the frames over the first transmission link between the REC and the first RE; and transmitting the frames over the second transmission link between the first and second RE, wherein each antenna carrier has a corresponding time slot in each frame so that data samples for each antenna carrier are inserted in that antenna carrier's corresponding time slot, and wherein for at least one antenna carrier, that antenna carrier's corresponding time slot on a slave port of the first RE receiving downlink information is different from that antenna carrier's corresponding time slot on a master port of the first RE receiving uplink information.

2. The method in claim 1, further comprising:

transceiving over the radio interface using code division multiple access (CDMA), wherein a time period of each frame corresponds to one CDMA chip time period, and wherein a rate of transmission over the first transmission link is approximately 614.3 Mbit/s, 1228.8 Mbit/s, or 2457.6 Mbit/s.

3. The method in claim 1, wherein the REC, the first RE, and the second RE are connected in a chain topology by the first and second transmission links, and wherein a rate of transmission over the first transmission link is approximately twice a rate of transmission over the second transmission link.

4. The method in claim 1, wherein the control information includes layer 1 (L1) signaling, the L1 signaling including a service access point defect indicator (SDI) that indicates whether higher layers are operational for data, synchronization, or control and management (C&M).

5. The method in claim 4, wherein when the first RE receives the SDI over the first transmission link, the first RE ignores the data received over the first transmission link, and forwards the SDI over the second transmission link to the second RE.

6. The method in claim 4, wherein when the first RE receives the SDI over the first transmission link, the first RE transmits data received on a redundant first transmission link over the second transmission link.

7. The method in claim 1, wherein when the control information sent by the REC includes a reset indicator, the first RE initiates a reset operation for the first RE and also sends the reset indicator to the second RE.

8. The method in claim 1, further comprising:

determining a first transmission time delay associated with the first transmission link;

determining a second transmission time delay associated with the second transmission link; and using the first and second transmission time delays in a loop delay determination associated with the REC, the first RE, and the second RE.

9. The method in claim 1, wherein the first transmission link connects a master port of the REC to the slave port of the first RE, and wherein the second transmission link connects the master port of the first RE to a slave port of the second RE.

10. The method in claim 9, wherein at least one of the REC, the first RE and the second RE includes multiple master ports and/or multiple slave ports, and wherein the rate of transmission over some of the ports is different.

11. The method in claim 9, further comprising:

each RE providing the REC with a time offset between that RE's input slave port and output slave port;

the REC transmitting a first frame synchronization signal to the first RE at a first time;

the first RE providing the REC with a downlink delay associated with receiving the first frame synchronization signal on its input slave port and transmitting the first frame synchronization signal on its output master port;

the first RE providing the REC with an uplink delay associated with receiving a second frame synchronization signal on its input master port and transmitting a third frame synchronization signal on its output slave port;

the REC receiving the third frame synchronization signal at a second time;

determining a time difference between the first and second times; and determining a first transmission time delay associated with the first transmission link and a second transmission time delay associated with the second transmission link based on the time difference, the downlink delay, the uplink delay, and each time offset.

12. The method in claim 1, further comprising:

determining a frame timing difference between when a downlink frame synchronization signal is transmitted from the REC and when an uplink frame synchronization signal is received back at the REC.

13. The method in claim 1, wherein the REC, the first RE, and the second RE are connected in a chain topology by the first and second transmission links, and wherein a rate of transmission over the first transmission link is different from a rate of transmission over the second transmission link.

14. A distributed radio base station, comprising:

a radio equipment controller (REC) configured to perform a baseband processing for the distributed radio base station;

a first radio equipment (RE) including one or more antenna elements;

a second radio equipment (RE) including one or more antenna elements;

a first communications link permitting communication between the REC and the first RE;

a second communications link permitting communication between the first RE and the second RE;

a communications interface defining a communications protocol for the first and second communications links;

wherein the REC includes:

an REC controller configured to provide control information and user information for transmission over the first communications link to the first RE, the user information including multiple data flows, each data flow corresponding to data associated with one antenna for one carrier;

an REC framer configured to format the control information and user information into multiple frames, where each frame includes a control time slot for the control information and multiple data time slots for the user information and each data time slot corresponds to a data flow of one of multiple antenna carriers; and an REC transmitter configured to transmit the frames over the first communications link to the first RE;

wherein the first RE is configured to receive the control information and user information from the REC for the second RE over the first communications link, the user information including multiple data flows, each data flow corresponding to data associated with one antenna for one carrier, the first RE including:

radio circuitry;
a first RE framer configured to format control information and user information into multiple frames, where each frame includes a control time slot for the control information and multiple data time slots for the user information and each data time slot corresponds to a data flow of one of multiple antenna carriers, the first RE framer configured to route first RE control and user information to and from the radio circuitry, and to forward second RE control and user information to and from the second RE; and
a first RE transmitter configured to transmit the frames over the first communications link,
wherein each antenna carrier has a corresponding time slot in each frame so that data samples for each antenna carrier are inserted in that antenna carrier's corresponding time slot, and
wherein for at least one antenna carrier, a antenna carrier's corresponding time slot on a slave port of the first RE receiving downlink information is different from that antenna carrier's corresponding time slot on a master port of the first RE receiving uplink information.

15. The radio base station in claim 14, wherein the control information includes layer 1 (L1) signaling, the L1 signaling including a service access point defect indicator (SDI) that indicates whether higher layers are operational for data, synchronization, or control and management (C&M).

16. The radio base station in claim 15, wherein the first RE is configured to
receive the SDI over the first transmission link,
ignore the data received over the first transmission link in response to receiving the SDI over the first transmission link, and
forward the SDI over the second transmission link to the second RE.

17. The radio base station in claim 15, wherein the first RE is configured to
receive the SDI over the first transmission link, and
transmit data received on a redundant first transmission link over the second transmission link in response to receiving the SDI over the first transmission link.

18. The radio base station in claim 15, wherein when the control information sent by the REC includes a reset indicator, the first RE is configured to initiate a reset operation for the first RE and send the reset indicator to the second RE.

19. The radio base station in claim 14, further comprising:
means for determining a first transmission time delay associated with the first transmission link;
means for determining a second transmission time delay associated with the second transmission link; and
means for using the first and second transmission time delays in a loop delay determination associated with the REC, the first RE, and the second RE.

20. The radio base station in claim 14,
wherein the first transmission link connects a master port of the REC to the slave port of the first RE, and
wherein the second transmission link connects the master port of the first RE to a slave port of the second RE.

21. The radio base station in claim 20, wherein
each RE is configured to provide the REC with a time offset between that RE's input slave port and output slave port,
the REC is configured to transmit a first frame synchronization signal to the first RE at a first time;
the first RE is configured to provide the REC with a downlink delay associated with receiving the first frame synchronization signal on the first RE's input slave port and transmitting the first frame synchronization signal on the first RE's output master port;
the first RE is configured to provide the REC with an uplink delay associated with receiving a second frame synchronization signal on the first RE's input master port and transmitting a third frame synchronization signal on the first RE's output slave port; and
the REC is configured to receive from the first RE the third frame synchronization signal at a second time, determine a time difference between the first and second times, and determine a first transmission time delay associated with the first transmission link and a second transmission time delay associated with the second transmission link based on the time difference, the downlink delay, the uplink delay, and each time offset.

22. The radio base station in claim 14, further comprising:
electronic circuitry configured to determine a frame timing difference between when a downlink frame synchronization signal is transmitted from the REC and when an uplink frame synchronization signal is received back at the REC.

23. The radio base station in claim 14,
wherein the REC, the first RE, and the second RE are connected in a chain topology by the first and second transmission links, and
wherein a rate of transmission over the first transmission link is different from a rate of transmission over the second transmission link.

24. A radio equipment controller (REC) for a distributed radio base station that also includes first and second radio equipments (REs) that each has one or more antenna elements, the REC being separate from and coupled to the first RE by a first transmission link and the first RE being separate from and coupled to the second RE by a second transmission link, the REC comprising:
a controller configured to provide control information and user information for transmission over the first and second communications links to the first and second REs, respectively, the user information including multiple data flows, each data flow corresponding to data associated with one antenna for one carrier;
a framer configured to format the control information and user information into multiple time division multiplexed (TDM) frames, where each TDM frame includes a control time slot for the control information and multiple data time slots for the user information and each data time slot corresponds to a data flow of one of multiple antenna carriers; and
a transmitter configured to transmit the frames over the first communications link intended for the first RE and the second RE, wherein the frames intended for the second RE are transmitted to the first RE for transmission by the first RE to the second RE over the second communications link,
wherein each antenna carrier has a corresponding time slot in each frame so that data samples for each antenna carrier are inserted in that antenna carrier's corresponding time slot, and
wherein for at least one antenna carrier, that antenna carrier's corresponding time slot on a slave port of the first RE receiving downlink information is different from that antenna carrier's corresponding time slot on a master port of the first RE receiving uplink information.

25. The REC in claim 24, wherein a rate of transmission over the first transmission link is approximately 614.3 Mbit/s, 1228.8 Mbit/s, or 2457.6 Mbit/s.

26. The REC in claim 24, wherein the control information includes layer 1 (L1) signaling, the L1 signaling including a service access point defect indicator (SDI) that indicates whether higher layers are operational for data, synchronization, or control and management (C&M).

27. The REC in claim 24, including electronic circuitry configured to:
determine a first transmission time delay associated with the first transmission link;
determine a second transmission time delay associated with the second transmission link; and
use the first and second transmission time delays in a loop delay determination associated with the REC, the first RE, and the second RE.

28. The REC in claim 24,
wherein the first transmission link connects a master port of the REC to the slave port of the first RE, and
wherein the second transmission link connects the master port of the first RE to a slave port of the second RE.

29. The REC in claim 28, wherein the REC is configured to:
transmit a first frame synchronization signal to the first RE at a first time when each RE provides the REC with a time offset between that RE's input slave port and output slave port;
receive a downlink delay from the first RE associated with receiving a first frame synchronization signal on the first RE's input slave port and transmitting the first frame synchronization signal on the first RE's output master port;
receive an uplink delay from the first RE associated with receiving a second frame synchronization signal on the first RE's input master port and transmitting a third frame synchronization signal on the first RE's output slave port;
receive the third frame synchronization signal at a second time from the first RE;
determine a difference between the first and second times; and
determine a first transmission time delay associated with the first transmission link and a second transmission time delay associated with the second transmission link based on the time difference, the downlink delay, the uplink delay, and each time offset.

30. The REC in claim 24, wherein the REC is configured to determine a frame timing difference between when a downlink frame synchronization signal is transmitted from the REC and when an uplink frame synchronization signal is received back at the REC.

31. The REC in claim 24,
wherein the REC, the first RE, and the second RE are connected in a chain topology by the first and second transmission links, and
wherein a rate of transmission over the first transmission link is different from a rate of transmission over the second transmission link.

32. A first radio equipment (RE) for use in a distributed radio base station that also includes a second RE and a radio equipment controller (REC) coupled to the first RE by a first communications link and coupled to the second RE by a second communications link, the first RE comprising:
a radio transceiving circuitry coupled to one or more antenna elements, the radio transceiving circuitry being configured to receive control information and user information for transmission over the first communications link to the REC, the user information including multiple data flows, each data flow corresponding to data associated with one antenna element for one carrier;
a first interface circuitry configured to receive frames including control information and user information for the REC from the second RE over the second communications link, the user information including multiple data flows, each data flow corresponding to data associated with one antenna element for one carrier, and each frame including a control time slot for the control information and multiple data time slots for the user information and each data time slot corresponds to a data flow of one of multiple antenna carriers;
a processing circuitry configured to format the control information and user information from the radio transceiving circuitry into multiple frames; and
a second interface circuitry configured to transmit the frames over the first communications link to the REC, wherein the frames include control and user information received from the radio transceiving circuitry and from the second RE,
wherein each antenna carrier has a corresponding time slot in each frame so that data samples for each antenna carrier are inserted in that antenna carrier's corresponding time slot, and
wherein for at least one antenna carrier, that antenna carrier's corresponding time slot on a slave port of the first RE receiving downlink information is different from that antenna carrier's corresponding time slot on a master port of the first RE receiving uplink information.

33. The first RE in claim 32,
wherein the second interface circuitry is configured to receive frames from the REC, and
wherein the processing circuitry is configured to route some of the received frames to the radio transceiving circuitry for transmission over a radio interface and to route others of the received frames to the first interface circuitry for transmission to the second RE over the second communications link.

34. The first RE in claim 33,
wherein the processing circuitry includes a framer/deframer, and
wherein the first and second interface circuitry each include a serializer/de-serializer.

35. The first RE in claim 32, wherein the control information includes layer 1 (L1) signaling, the L1 signaling including a service access point defect indicator (SDI) that indicates whether higher layers are operational for data, synchronization, or control and management (C&M).

36. The first RE in claim 35, wherein when the first RE receives the SDI over the first transmission link, the first RE is configured to ignore the data received over the first transmission link and forward the SDI to the first interface circuitry for transmission over the second transmission link to the second RE.

37. The first RE in claim 35, wherein when the first RE receives the SDI over the first transmission link, the first RE is configured to transmit data received on a redundant first transmission link over the second transmission link.

38. The first RE in claim 32, wherein when the control information sent by the REC includes a reset indicator, the first RE is configured to initiate a reset operation for the first RE and to send the reset indicator to the second RE.

39. The first RE in claim 32,
wherein the first transmission link connects a master port of the REC to the slave port of the first RE, and
wherein the second transmission link connects the master port of the first RE to a slave port of the second RE.

40. The first RE in claim 39, wherein the first RE is configured to provide the REC with a time offset between the first RE's input slave port and output slave port, and in response to receiving a first frame synchronization signal transmitted to the first RE at a first time, the first RE is configured to provide the REC with a downlink delay associated with receiving the first frame synchronization signal on the first RE's input slave port and transmitting the first frame synchronization signal on the first RE's output master port, and with an uplink delay associated with receiving a second frame synchronization signal on the first RE's input master port and transmitting a third frame synchronization signal on the first RE's output slave port.

41. The first RE in claim 32,
  wherein the REC, the first RE, and the second RE are connected in a chain topology by the first and second transmission links, and
  wherein a rate of transmission over the first transmission link is different from a rate of transmission over the second transmission link.

\* \* \* \* \*

UNITED STATES PATENT AND TRADEMARK OFFICE
CERTIFICATE OF CORRECTION

PATENT NO. : 8,908,650 B2  
APPLICATION NO. : 11/663045  
DATED : December 9, 2014  
INVENTOR(S) : Aarflot et al.

Page 1 of 1

It is certified that error appears in the above-identified patent and that said Letters Patent is hereby corrected as shown below:

On the title page item (75), under "Inventors", in Column 1, Line 2, delete "Järfaälla" and insert -- Järfälla --, therefor.

On the title page item (75), under "Inventors", in Column 1, Line 6, delete "Werner Korte," and insert -- Werner Korte, Deceased, --, therefor.

In the Specification,

In Column 5, Line 21, delete "embodiment." and insert -- embodiment; --, therefor.

In Column 7, Line 27, delete "information," and insert -- information --, therefor.

In Column 9, Line 7, delete "fate" and insert -- rate --, therefor.

In Column 10, Line 62, delete "it own" and insert -- it's own --, therefor.

In Column 11, Line 62, delete "UMTs" and insert -- UMTS --, therefor.

In Column 11, Line 66, delete "UNITS." and insert -- UMTS. --, therefor.

In Column 17, Line 5, delete "Toffset. F" and insert -- Toffset. --, therefor.

In the Claims,

In Column 21, Line 19, in Claim 14, delete "a antenna" and insert -- that antenna --, therefor.

Signed and Sealed this  
Thirtieth Day of June, 2015

Michelle K. Lee  
*Director of the United States Patent and Trademark Office*